United States Patent
Lee et al.

(10) Patent No.: US 7,220,166 B2
(45) Date of Patent: May 22, 2007

(54) METHODS AND APPARATUS FOR ELECTROMECHANICALLY AND/OR ELECTROCHEMICALLY-MECHANICALLY REMOVING CONDUCTIVE MATERIAL FROM A MICROELECTRONIC SUBSTRATE

(75) Inventors: Whonchee Lee, Boise, ID (US); Scott E. Moore, Meridian, ID (US); Scott G. Meikle, Gainesville, VA (US)

(73) Assignee: Micron Technology, Inc., Boise, ID (US)

( * ) Notice: Subject to any disclaimer, the term of this patent is extended or adjusted under 35 U.S.C. 154(b) by 100 days.

(21) Appl. No.: 10/230,970

(22) Filed: Aug. 29, 2002

(65) Prior Publication Data

US 2003/0054729 A1   Mar. 20, 2003

Related U.S. Application Data

(63) Continuation-in-part of application No. 09/651,779, filed on Aug. 30, 2000, and a continuation-in-part of application No. 09/888,084, filed on Jun. 21, 2001, and a continuation-in-part of application No. 09/887,767, filed on Jun. 21, 2001, and a continuation-in-part of application No. 09/888,002, filed on Jun. 21, 2001.

(51) Int. Cl.
*B24B 1/00* (2006.01)

(52) U.S. Cl. .................................. 451/41; 451/287
(58) Field of Classification Search ............... 451/41, 451/285, 286, 287, 288, 289; 438/692, 693; 205/652, 656, 658, 659, 671
See application file for complete search history.

(56) References Cited

U.S. PATENT DOCUMENTS 2,315,695 A   4/1943   Faust
2,516,105 A   7/1950   der Mateosian
3,239,439 A   3/1966   Helmke (Continued)

FOREIGN PATENT DOCUMENTS

| EP | 0459397 A2 | 12/1991 |
| EP | 0459397 A3 | 12/1991 |
| EP | 1 123 956 A1 | 8/2001 |

(Continued)

OTHER PUBLICATIONS

U.S. Appl. No. 09/651,779, filed Aug. 30, 2000, Moore.
U.S. Appl. No. 09/651,808, filed Aug. 30, 2000, Chopra et al.
U.S. Appl. No. 09/653,392, filed Aug. 31, 2000, Chopra et al.

(Continued)

*Primary Examiner*—Dung Van Nguyen
(74) *Attorney, Agent, or Firm*—Perkins Coie LLP

(57) ABSTRACT

Methods and apparatuses for electromechanically and/or electrochemically-mechanically removing conductive material from a microelectronic substrate. An apparatus in accordance with one embodiment includes a support member configured to releasably carry a microelectronic substrate and first and second electrodes spaced apart from each other and from the microelectronic substrate. A polishing medium is positioned between the electrodes and the support member and has a polishing surface positioned to contact the microelectronic substrate. At least a portion of the first and second electrodes can be recessed from the polishing surface. A liquid, such as an electrolytic liquid, can be provided in the recess, for example, through flow passages in the electrodes and/or the polishing medium. A variable electrical signal is passed from at least one of the electrodes, through the electrolyte and to the microelectronic substrate to remove material from the substrate.

45 Claims, 13 Drawing Sheets

U.S. PATENT DOCUMENTS

| | | |
|---|---|---|
| 3,334,210 A | 8/1967 | Williams et al. |
| 4,839,005 A | 6/1989 | Katsumoto et al. |
| 5,098,533 A | 3/1992 | Duke et al. |
| 5,162,248 A | 11/1992 | Dennison et al. |
| 5,244,534 A | 9/1993 | Yu et al. |
| 5,300,155 A | 4/1994 | Sandhu et al. |
| 5,344,539 A | 9/1994 | Shinogi et al. |
| 5,562,529 A * | 10/1996 | Kishii et al. .................. 451/36 |
| 5,567,300 A | 10/1996 | Datta et al. |
| 5,575,885 A | 11/1996 | Hirabayashi et al. |
| 5,618,381 A | 4/1997 | Doan et al. |
| 5,624,300 A | 4/1997 | Kishii et al. |
| 5,676,587 A | 10/1997 | Landers et al. |
| 5,681,423 A | 10/1997 | Sandhu et al. |
| 5,780,358 A | 7/1998 | Zhou et al. |
| 5,807,165 A | 9/1998 | Uzoh et al. |
| 5,840,629 A | 11/1998 | Carpio |
| 5,843,818 A | 12/1998 | Joo et al. |
| 5,846,398 A | 12/1998 | Carpio |
| 5,863,307 A | 1/1999 | Zhou et al. |
| 5,888,866 A | 3/1999 | Chien |
| 5,897,375 A | 4/1999 | Watts et al. |
| 5,911,619 A | 6/1999 | Uzoh et al. |
| 5,930,699 A | 7/1999 | Bhatia |
| 5,934,980 A | 8/1999 | Koos et al. |
| 5,952,687 A | 9/1999 | Kawakubo et al. |
| 5,954,975 A | 9/1999 | Cadien et al. |
| 5,954,997 A | 9/1999 | Kaufman et al. |
| 5,972,792 A | 10/1999 | Hudson |
| 5,993,637 A | 11/1999 | Hisamatsu et al. |
| 6,001,730 A | 12/1999 | Farkas et al. |
| 6,007,695 A | 12/1999 | Knall et al. |
| 6,010,964 A | 1/2000 | Glass |
| 6,024,856 A | 2/2000 | Haydu et al. |
| 6,033,953 A | 3/2000 | Aoki et al. |
| 6,039,633 A | 3/2000 | Chopra |
| 6,046,099 A | 4/2000 | Cadien et al. |
| 6,051,496 A | 4/2000 | Jang |
| 6,060,386 A | 5/2000 | Givens |
| 6,060,395 A | 5/2000 | Skrovan et al. |
| 6,063,306 A | 5/2000 | Kaufman et al. |
| 6,066,030 A | 5/2000 | Uzoh |
| 6,066,559 A | 5/2000 | Gonzalez et al. |
| 6,068,787 A | 5/2000 | Grumbine et al. |
| 6,083,840 A | 7/2000 | Mravic, et al. |
| 6,100,197 A | 8/2000 | Hasegawa |
| 6,103,096 A | 8/2000 | Datta et al. |
| 6,103,628 A | 8/2000 | Talieh |
| 6,103,636 A | 8/2000 | Zahorik, deceased et al. |
| 6,115,233 A | 9/2000 | Seliskar et al. |
| 6,117,781 A | 9/2000 | Lukanc et al. |
| 6,121,152 A | 9/2000 | Adams et al. |
| 6,132,586 A | 10/2000 | Adams et al. |
| 6,143,155 A | 11/2000 | Adams et al. |
| 6,162,681 A | 12/2000 | Wu |
| 6,171,467 B1 | 1/2001 | Weihs et al. |
| 6,174,425 B1 | 1/2001 | Simpson et al. |
| 6,176,992 B1 | 1/2001 | Talieh |
| 6,180,947 B1 | 1/2001 | Stickel et al. |
| 6,187,651 B1 | 2/2001 | Oh |
| 6,190,494 B1 | 2/2001 | Dow |
| 6,196,899 B1 | 3/2001 | Chopra et al. |
| 6,197,182 B1 | 3/2001 | Kaufman et al. |
| 6,206,756 B1 | 3/2001 | Chopra et al. |
| 6,218,309 B1 | 4/2001 | Miller et al. |
| 6,250,994 B1 | 6/2001 | Chopra et al. |
| 6,259,128 B1 | 7/2001 | Adler et al. |
| 6,273,786 B1 | 8/2001 | Chopra et al. |
| 6,276,996 B1 | 8/2001 | Chopra |
| 6,280,581 B1 | 8/2001 | Cheng |
| 6,287,974 B1 | 9/2001 | Miller |
| 6,299,741 B1 | 10/2001 | Sun et al. |
| 6,303,956 B1 | 10/2001 | Sandhu et al. |
| 6,313,038 B1 | 11/2001 | Chopra et al. |
| 6,322,422 B1 | 11/2001 | Satou |
| 6,328,632 B1 | 12/2001 | Chopra |
| 6,368,184 B1 | 4/2002 | Beckage |
| 6,368,190 B1 * | 4/2002 | Easter et al. .................. 451/41 |
| 6,379,223 B1 * | 4/2002 | Sun et al. .................. 451/41 |
| 6,395,607 B1 | 5/2002 | Chung |
| 6,416,647 B1 | 7/2002 | Dordi et al. |
| 6,455,370 B1 | 9/2002 | Lane |
| 6,461,911 B2 | 10/2002 | Ahn et al. |
| 6,464,855 B1 | 10/2002 | Chadda et al. |
| 6,852,630 B2 | 10/2002 | Basol et al. |
| 6,504,247 B2 | 1/2003 | Chung |
| 6,867,136 B2 | 6/2003 | Basol et al. |
| 6,620,037 B2 | 9/2003 | Kaufman et al. |
| 6,689,258 B1 | 2/2004 | Lansford et al. |
| 6,693,036 B1 | 2/2004 | Nogami et al. |
| 6,848,970 B2 | 3/2004 | Manens et al. |
| 6,722,942 B1 | 4/2004 | Lansford et al. |
| 6,722,950 B1 | 4/2004 | Dabral et al. |
| 6,736,952 B2 | 5/2004 | Emesh et al. |
| 6,753,250 B1 | 6/2004 | Hill et al. |
| 6,776,693 B2 | 8/2004 | Duboust et al. |
| 6,780,772 B2 | 8/2004 | Uzoh et al. |
| 6,893,328 B2 | 10/2004 | So |
| 6,846,227 B2 | 1/2005 | Sato et al. |
| 6,881,664 B2 | 4/2005 | Catabay et al. |
| 2001/0025976 A1 | 10/2001 | Lee |
| 2001/0036746 A1 | 11/2001 | Sato et al. |
| 2002/0025759 A1 | 2/2002 | Lee et al. |
| 2002/0025760 A1 | 2/2002 | Lee et al. |
| 2002/0025763 A1 | 2/2002 | Lee et al. |
| 2002/0052126 A1 | 5/2002 | Lee et al. |
| 2002/0070126 A1 | 6/2002 | Sato et al. |
| 2002/0104764 A1 | 8/2002 | Banerjee et al. |
| 2002/0115283 A1 | 8/2002 | Ho et al. |
| 2003/0064669 A1 | 4/2003 | Basol et al. |
| 2003/0178320 A1 | 9/2003 | Liu et al. |
| 2004/0192052 A1 | 9/2004 | Mukherjee et al. |
| 2004/0259479 A1 | 12/2004 | Sevilla |
| 2005/0059324 A1 | 3/2005 | Lee et al. |
| 2005/0133379 A1 | 6/2005 | Basol et al. |
| 2005/0173260 A1 | 8/2005 | Basol et al. |
| 2005/0178743 A1 | 8/2005 | Manens et al. |

FOREIGN PATENT DOCUMENTS

| | | |
|---|---|---|
| JP | 1-241129 A | 9/1989 |
| JP | 2001077117 A1 | 3/2001 |
| WO | WO 00/26443 A3 | 5/2000 |
| WO | WO 00/26443 A2 | 5/2000 |
| WO | WO 00/28586 A3 | 5/2000 |
| WO | WO 00/28586 A2 | 5/2000 |
| WO | WO 00/32356 A1 | 6/2000 |
| WO | WO 00/59008 A2 | 10/2000 |
| WO | WO 00/59008 A3 | 10/2000 |
| WO | WO 00/59682 A1 | 10/2000 |
| WO | WO 02/064314 A1 | 8/2002 |

OTHER PUBLICATIONS

U.S. Appl. No. 10/090,869, filed Mar. 4, 2002, Moore et al.

U.S. Appl. No. 10/230,463, filed Aug. 29, 2002, Lee et al.

U.S. Appl. No. 10/230,602, filed Aug. 29, 2002, Chopra.

U.S. Appl. No. 10/230,628, filed Aug. 29, 2002, Lee et al.

U.S. Appl. No. 10/230,972, filed Aug. 29, 2002, Lee et al.

U.S. Appl. No. 10/230,973, filed Aug. 29, 2002, Lee et al.

Frankenthal, R.P. and Eaton, D.H., "Electroetching of Platinum in the Titanium–Platinum–Gold Metallization on Silicon Integrated Circuits," Journal of The Electrochemical Society, vol. 123, No.5, pp. 703–706, May 1976, Pennington, New Jersey.

Bernhardt, A.F., Contolini, R.J., Mayer, S.T., "Electrochemical Planarization for Multi–Level Metallization of Microcircuitry," CircuiTree, vol. 8, No. 10, pp. 38, 40, 42, 44, 46, and 48, Oct. 1995.

McGraw–Hill, "Chemical bonding," Concise Encyclopedia of Science & Technology, Fourth Edition, Sybil P. Parker, Editor in Chief, p. 367, McGraw–Hill, New York, New York, 1998.

PhysicsWorld, "Hard Materials", http://physicsweb.org/box/world/11/1/11/world–11–1–11–1 (accessed Jul. 29, 2002), 1 page, excerpt of "Superhard superlattices," S. Barnett and A. Madan, Physics World, Jan. 1998, Institute of Physics Publishing Ltd., Bristol, United Kingdom.

Huang, C.S. et al., "A Novel UV Baking Process to Improve DUV Photoresist Hardness, " pp. 135–138, Proceedings of the 1999 International Symposium on VLSI Technology, Systems, and Applications: Proceedings of Technical Papers: Jun. 8–10, 1999, Taipei, Taiwan, Institute of Electrical and Electronics Engineers, Inc., Sep. 1999.

ATMI, Inc., Internal document, adapted from a presentation at the Semicon West '99 Low Dielectric Materials Technology Conference, San Francisco, California, Jul. 12, 1999, pp. 13–25.

Kondo, S. et al., "Abrasive–Free Polishing for Copper Damascene Interconnection," Journal of the Electrochemical Society, vol. 147, No. 10, pp. 3907–3913, The Electrochemical Society, Inc., Pennington, New Jersey, 2000.

Micro Photonics, Inc., CSM Application Bulletin, "Low–load Micro Scratch Tester (MST) for characterisation of thin polymer films," http://www.microphotonics.com/mstAB-poly.html (accessed Jul. 25, 2002), 3 pages, Irvine, California.

Micro Photonics, Inc., "CSM Nano Hardness Tester," http://www.microphotonics.com/nht.html (accessed Jul. 29, 2002), 6 pages, Irvine, California.

PCT International Search Report dated Dec. 1, 2003 for PCT/US03/27181 filed Aug. 27, 2003 (7 pages).

D'Heurle, F.M. and K.C. Park, IBM Technical Disclosure Bulletin, Electrolytic Process for Metal Pattern Generation, vol. 17, No. 1, pp. 271–272, Jun. 1974, XP–002235691, NN 7406271.

Aboaf, J.A. and R.W. Broadie, IBM Technical Disclosure Bulletin, Rounding of Square–Shape Holes in Silicon Wafers, vol. 19, No. 8, p. 3042, Jan. 1977, XP–002235690, NN 77013042.

Bassous, E., IBM Technical Disclosure Bulletin, Low Temperature Methods for Rounding Silicon Nozzles, vol. 20, No. 2, Jul. 1977, pp. 810–811, XP–002235692, NN 7707810.

PCT International Search Report, International Application No. PCT/US02/19495, Mar. 31, 2003.

PCT International Search Report, International Application No. PCT/US02/19496, Apr. 4, 2003.

PCT Written Opinion dated Jun. 10, 2003 for PCT/US02/19495 filed Jun. 20, 2002 (7 pages).

PCT Written Opinion dated Jun. 10, 2003 for PCT/US02/19496 filed Jun. 20, 2002 (8 pages).

PCT International Search Report dated Jul. 10, 2003 for PCT/US03/06373 filed Feb. 28, 2003 (4 pages).

U.S. Appl. No. 09/653,411, filed Aug. 31, 2000, Lee et al.

Juchniewicz, R. et al. "Influence of Pulsed Current on Platinised Titanium and Tantalum Anode Durability," International Congress on Metallic Corrosion, Proceedings—vol. 3, pp. 449–453, Toronto, Jun. 3–7, 1984.

* cited by examiner

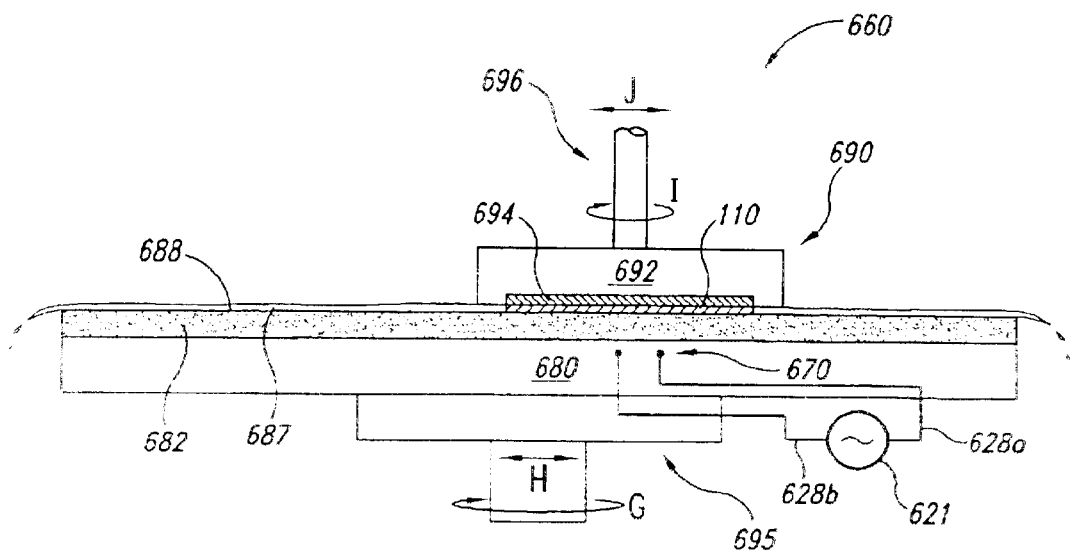
Fig. 11
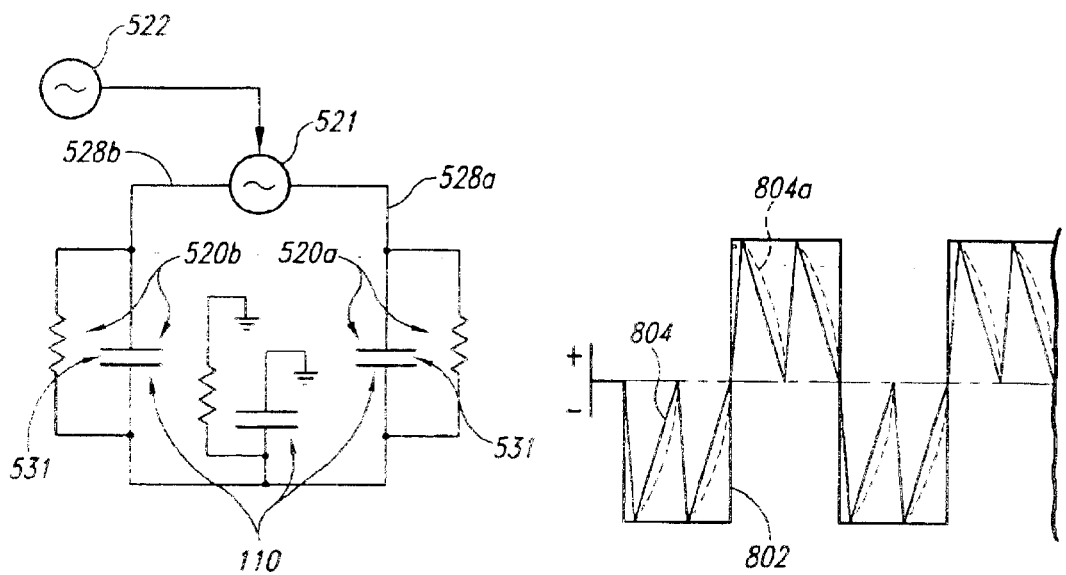
Fig. 12A
Fig. 12B

METHODS AND APPARATUS FOR ELECTROMECHANICALLY AND/OR ELECTROCHEMICALLY-MECHANICALLY REMOVING CONDUCTIVE MATERIAL FROM A MICROELECTRONIC SUBSTRATE

CROSS-REFERENCE TO RELATED APPLICATIONS

This application is a continuation-in-part of the following pending U.S. patent applications, all of which are incorporated herein by reference: Ser. No. 09/651 779, filed Aug. 30, 2000, Ser. No. 09/888,084, filed Jun. 21, 2001, Ser. No. 09/887,767, filed Jun. 21, 2001, and Ser. No. 09/888,002, filed Jun. 21, 2001. This application is also related to the following U.S. patent applications, filed simultaneously herewith and incorporated herein by reference: Ser. Nos. 10/230,972; 10/230,973; 10/230,463; and 10/230,628.

TECHNICAL FIELD

This invention relates to methods and apparatuses for electromechanically and/or electrochemically-mechanically removing conductive material from microelectronic substrates.

BACKGROUND

Microelectronic substrates and substrate assemblies typically include a semiconductor material having features, such as memory cells, that are linked with conductive lines. The conductive lines can be formed by first forming trenches or other recesses in the semiconductor material, and then overlaying a conductive material (such as a metal) in the trenches. The conductive material is then selectively removed to leave conductive lines extending from one feature in the semiconductor material to another.

Electrolytic techniques have been used to both deposit and remove metallic layers from semiconductor substrates. For example, an alternating current can be applied to a conductive layer via an intermediate electrolyte to remove portions of the layer. In one arrangement, shown in FIG. 1, a conventional apparatus 60 includes a first electrode 20a and a second electrode 20b coupled to a current source 21. The first electrode 20a is attached directly to a metallic layer 11 of a semiconductor substrate 10 and the second electrode 20b is at least partially immersed in a liquid electrolyte 31 disposed on the surface of the metallic layer 11 by moving the second electrode downwardly until it contacts the electrolyte 31. A barrier 22 protects the first electrode 20a from direct contact with the electrolyte 31. The current source 21 applies alternating current to the substrate 10 via the electrodes 20a and 20b and the electrolyte 31 to remove conductive material from the conductive layer 11. The alternating current signal can have a variety of wave forms, such as those disclosed by Frankenthal et al. in a publication entitled, "Electroetching of Platinum in the Titanium-Platinum-Gold Metallization on Silicon Integrated Circuits" (Bell Laboratories), incorporated herein in its entirety by reference.

One drawback with the arrangement shown in FIG. 1 is that it may not be possible to remove material from the conductive layer 11 in the region where the first electrode 20a is attached because the barrier 22 prevents the electrolyte 31 from contacting the substrate 10 in this region. Alternatively, if the first electrode 20a contacts the electrolyte in this region, the electrolytic process can degrade the first electrode 20a. Still a further drawback is that the electrolytic process may not uniformly remove material from the substrate 10. For example, "islands" of residual conductive material having no direct electrical connection to the first electrode 20a may develop in the conductive layer 11. The residual conductive material can interfere with the formation and/or operation of the conductive lines, and it may be difficult or impossible to remove with the electrolytic process unless the first electrode 20a is repositioned to be coupled to such "islands."

One approach to addressing some of the foregoing drawbacks is to attach a plurality of first electrodes 20a around the periphery of the substrate 10 to increase the uniformity with which the conductive material is removed. However, islands of conductive material may still remain despite the additional first electrodes 20a. Another approach is to form the electrodes 20a and 20b from an inert material, such as carbon, and remove the barrier 22 to increase the area of the conductive layer 11 in contact with the electrolyte 31. However, such inert electrodes may not be as effective as more reactive electrodes at removing the conductive material, and the inert electrodes may still leave residual conductive material on the substrate 10.

FIG. 2 shows still another approach to addressing some of the foregoing drawbacks in which two substrates 10 are partially immersed in a vessel 30 containing the electrolyte 31. The first electrode 20a is attached to one substrate 10 and the second electrode 20b is attached to the other substrate 10. An advantage of this approach is that the electrodes 20a and 20b do not contact the electrolyte. However, islands of conductive material may still remain after the electrolytic process is complete, and it may be difficult to remove conductive material from the points at which the electrodes 20a and 20b are attached to the substrates 10.

SUMMARY

The present invention is directed toward methods and apparatuses for electromechanically and/or electrochemically-mechanically removing conductive material from a microelectronic substrate. An apparatus in accordance with one aspect of the invention includes a support member configured to releasably carry a microelectronic substrate. First and second electrodes are positioned to be spaced apart from each other and from the microelectronic substrate when the microelectronic substrate is carried by the support member. At least one of the electrodes is coupleable to a source of varying electrical signals. A polishing medium, at least a portion of which is positioned between the electrodes and the support member, includes a polishing surface positioned to contact the microelectronic substrate when the microelectronic substrate is carried by the support member. At least a portion of the first and second electrodes is recessed from the polishing surface.

In another aspect of the invention, the apparatus can include flow passages to provide a liquid, such as an electrolytic liquid, at least proximate to an interface between the polishing surface and the microelectronic substrate. For example, the flow passages can be positioned in the polishing medium and/or in at least one of the first and second electrodes. In yet a further aspect of the invention, the flow passages can include apertures that are recessed from the polishing surface of the polishing medium.

A method for removing material from a microelectronic substrate in accordance with yet another aspect of the invention includes positioning the microelectronic substrate proximate to and spaced apart from the first and second electrodes, with the first and second electrodes elongated along first and second axes, respectively. The method can further include moving the microelectronic substrate relative to the first and second electrodes in a direction transverse to at least one of the first and second axes, while passing a variable electrical signal through the first and second electrodes and the microelectronic substrate.

A method in accordance with still another aspect of the invention includes contacting the microelectronic substrate with a polishing surface of a polishing medium, positioning the microelectronic substrate proximate to and spaced apart from first and second electrodes, which are in turn spaced apart from each other and recessed from the polishing surface. The method can further include moving the microelectronic substrate relative to the first and second electrodes while passing a variable electrical signal through the electrodes and the microelectronic substrate. In still a further aspect of the invention, a liquid, such as an electrolytic liquid, can be introduced into a region at least proximate to an interface between the polishing surface and the microelectronic substrate through the first electrode, the second electrode, and/or the polishing medium.

BRIEF DESCRIPTION OF THE DRAWINGS

FIG. 11 is a partially schematic, side elevational view of an apparatus for both planarizing and electrolytically processing microelectronic substrates in accordance with still another embodiment of the invention.

FIGS. 12A–B schematically illustrate a circuit and wave form for electrolytically processing a microelectronic substrate in accordance with yet another embodiment of the invention.

DETAILED DESCRIPTION

The present disclosure describes methods and apparatuses for removing conductive materials from a microelectronic substrate and/or substrate assembly used in the fabrication of microelectronic devices. Many specific details of certain embodiments of the invention are set forth in the following description and in FIGS. 3–18 to provide a thorough understanding of these embodiments. One skilled in the art, however, will understand that the present invention may have additional embodiments, or that the invention may be practiced without several of the details described below.

Figure 3:
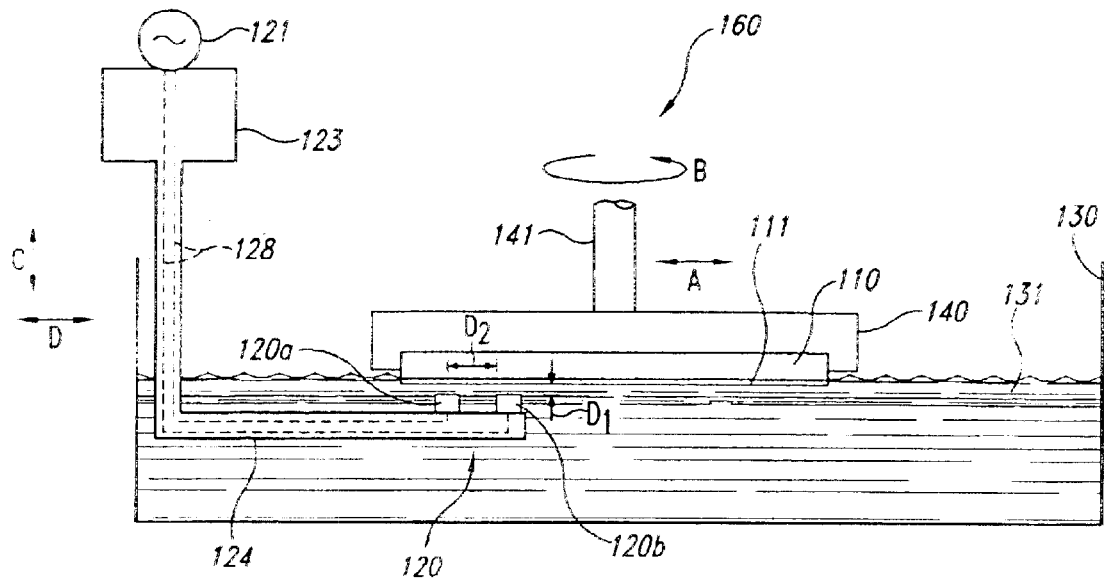
FIG. 3 is a partially schematic, side elevational view of an apparatus having a support member and a pair of electrodes for removing conductive material from a microelectronic substrate in accordance with an embodiment of the invention.

FIG. 3 is a partially schematic, side elevational view of an apparatus 160 for removing conductive material from a microelectronic substrate or substrate assembly 110 in accordance with an embodiment of the invention. In one aspect of this embodiment, the apparatus 160 includes a vessel 130 containing an electrolyte 131, which can be in a liquid or a gel state. A support member 140 supports the microelectronic substrate 110 relative to the vessel 130 so that a conductive layer 111 of the substrate 110 contacts the electrolyte 131. The conductive layer 111 can include metals such as platinum, tungsten, tantalum, gold, copper, or other conductive materials. In another aspect of this embodiment, the support member 140 is coupled to a substrate drive unit 141 that moves the support member 140 and the substrate 110 relative to the vessel 130. For example, the substrate drive unit 141 can translate the support member 140 (as indicated by arrow "A") and/or rotate the support member 140 (as indicated by arrow "B").

The apparatus 160 can further include a first electrode 120a and a second electrode 120b (referred to collectively as electrodes 120) supported relative to the microelectronic substrate 110 by a support member 124. In one aspect of this embodiment, the support arm 124 is coupled to an electrode drive unit 123 for moving the electrodes 120 relative to the microelectronic substrate 110. For example, the electrode drive unit 123 can move the electrodes toward and away from the conductive layer 111 of the microelectronic substrate 110, (as indicated by arrow "C"), and/or transversely (as indicated by arrow "D") in a plane generally parallel to the conductive layer 111. Alternatively, the electrode drive unit 123 can move the electrodes in other fashions, or the electrode drive unit 123 can be eliminated when the substrate drive unit 141 provides sufficient relative motion between the substrate 110 and the electrodes 120.

In either embodiment described above with reference to FIG. 3, the electrodes 120 are coupled to a current source 121 with leads 128 for supplying electrical current to the electrolyte 131 and the conductive layer 111. In operation, the current source 121 supplies an alternating current (single phase or multiphase) to the electrodes 120. The current passes through the electrolyte 131 and reacts electrochemically with the conductive layer 111 to remove material (for example, atoms or groups of atoms) from the conductive layer 111. The electrodes 120 and/or the substrate 110 can be moved relative to each other to remove material from selected portions of the conductive layer 111, or from the entire conductive layer 111.

In one aspect of an embodiment of the apparatus 160 shown in FIG. 3, a distance $D_1$ between the electrodes 120 and the conductive layer 111 is set to be smaller than a distance $D_2$ between the first electrode 120a and the second electrode 120b. Furthermore, the electrolyte 131 generally has a higher resistance than the conductive layer 111. Accordingly, the alternating current follows the path of least resistance from the first electrode 120a, through the electrolyte 131 to the conductive layer 111 and back through the electrolyte 131 to the second electrode 120b, rather than from the first electrode 120a directly through the electrolyte 131 to the second electrode 120b. Alternatively, a low dielectric material (not shown) can be positioned between the first electrode 120a and the second electrode 120b to decouple direct electrical communication between the electrodes 120 that does not first pass through the conductive layer 111.

Figure 1:
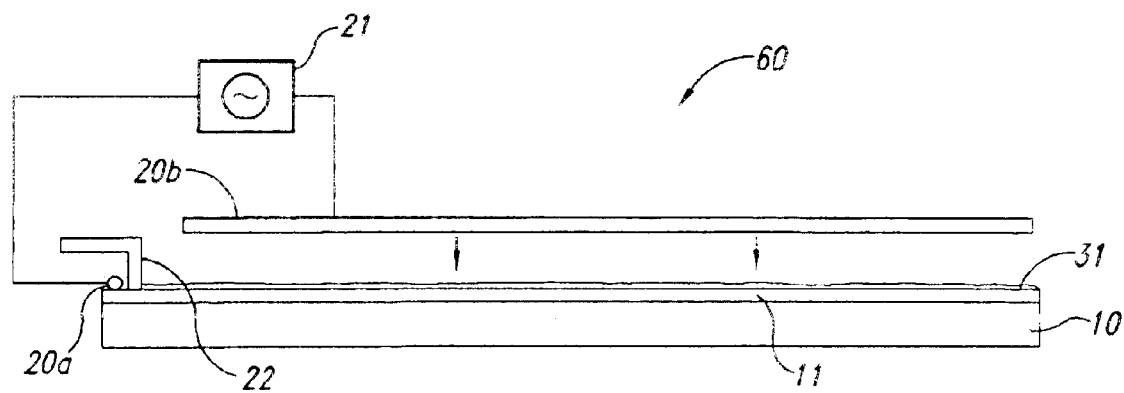
FIG. 1 is a partially schematic, side elevational view of an apparatus for removing conductive material from a semiconductor substrate in accordance with the prior art.
Figure 2:
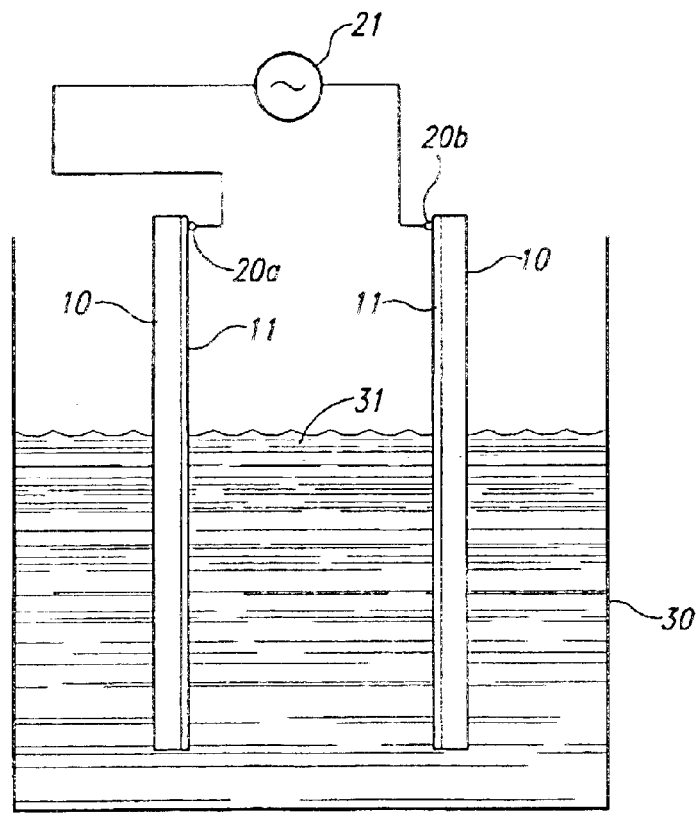
FIG. 2 is a partially schematic side, elevational view of another apparatus for removing conductive material from two semiconductor substrates in accordance with the prior art.

One feature of an embodiment of the apparatus 160 shown in FIG. 3 is that the electrodes 120 do not contact the conductive layer 111 of the substrate 110. An advantage of this arrangement is that it can eliminate the residual conductive material resulting from a direct electrical connection between the electrodes 120 and the conductive layer 111, described above with reference to FIGS. 1 and 2. For example, the apparatus 160 can eliminate residual conductive material adjacent to the contact region between the electrodes and the conductive layer because the electrodes 120 do not contact the conductive layer 111.

Another feature of an embodiment of the apparatus 160 described above with reference to FIG. 3 is that the substrate 110 and/or the electrodes 120 can move relative to the other to position the electrodes 120 at any point adjacent to the conductive layer 111. An advantage of this arrangement is that the electrodes 120 can be sequentially positioned adjacent to every portion of the conductive layer to remove material from the entire conductive layer 111. Alternatively, when it is desired to remove only selected portions of the conductive layer 111, the electrodes 120 can be moved to those selected portions, leaving the remaining portions of the conductive layer 111 intact.

Figure 4:
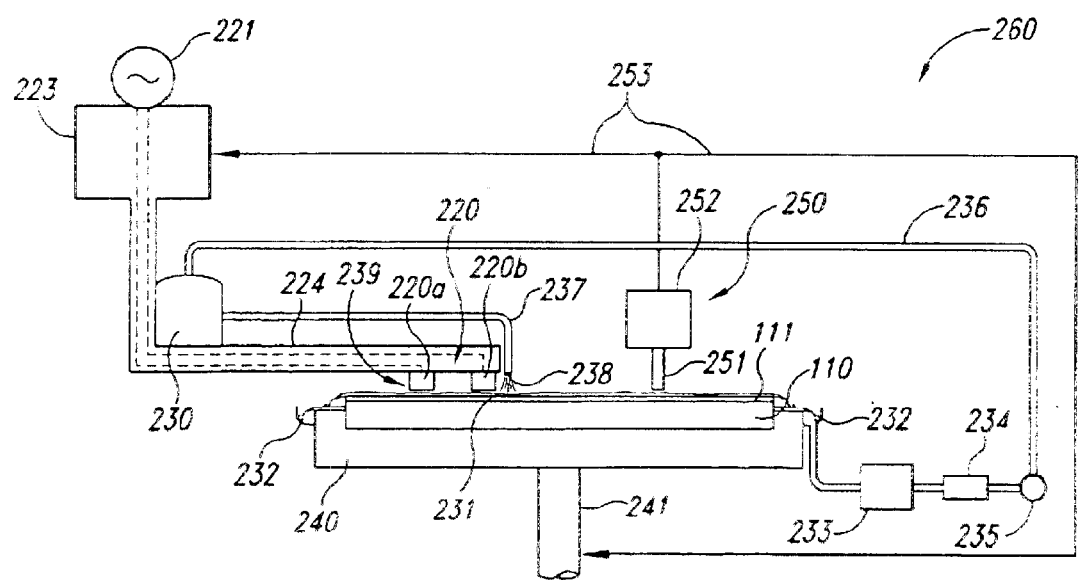
FIG. 4 is a partially schematic, side elevational view of an apparatus for removing conductive material and sensing characteristics of the microelectronic substrate from which the material is removed in accordance with another embodiment of the invention.

FIG. 4 is a partially schematic, side elevational view of an apparatus 260 that includes a support member 240 positioned to support the substrate 110 in accordance with another embodiment of the invention. In one aspect of this embodiment, the support member 240 supports the substrate 110 with the conductive layer 111 facing upwardly. A substrate drive unit 241 can move the support member 240 and the substrate 110, as described above with reference to FIG. 3. First and second electrodes 220a and 220b are positioned above the conductive layer 111 and are coupled to a current source 221. A support member 224 supports the electrodes 220 relative to the substrate 110 and is coupled to an electrode drive unit 223 to move the electrodes 220 over the surface of the support conductive layer 111 in a manner generally similar to that described above with reference to FIG. 3.

In one aspect of the embodiment shown in FIG. 4, the apparatus 260 further includes an electrolyte vessel 230 having a supply conduit 237 with an aperture 238 positioned proximate to the electrodes 220. Accordingly, an electrolyte 231 can be deposited locally in an interface region 239 between the electrodes 220 and the conductive layer 111, without necessarily covering the entire conductive layer 111. The electrolyte 231 and the conductive material removed from the conductive layer 111 flow over the substrate 110 and collect in an electrolyte receptacle 232. The mixture of electrolyte 231 and conductive material can flow to a reclaimer 233 that removes most of the conductive material from the electrolyte 231. A filter 234 positioned downstream of the reclaimer 233 provides additional filtration of the electrolyte 231 and a pump 235 returns the reconditioned electrolyte 231 to the electrolyte vessel 230 via a return line 236.

In another aspect of the embodiment shown in FIG. 4, the apparatus 260 can include a sensor assembly 250 having a sensor 251 positioned proximate to the conductive layer 111, and a sensor control unit 252 coupled to the sensor 251 for processing signals generated by the sensor 251. The control unit 252 can also move the sensor 251 relative to the substrate 110. In a further aspect of this embodiment, the sensor assembly 250 can be coupled via a feedback path 253 to the electrode drive unit 223 and/or the substrate drive unit 241. Accordingly, the sensor 251 can determine which areas of the conductive layer 111 require additional material removal and can move the electrodes 220 and/or the substrate 110 relative to each other to position the electrodes 220 over those areas. Alternatively, (for example, when the removal process is highly repeatable), the electrodes 220 and/or the substrate 110 can move relative to each other according to a pre-determined motion schedule.

The sensor 251 and the sensor control unit 252 can have any of a number of suitable configurations. For example, in one embodiment, the sensor 251 can be an optical sensor that detects removal of the conductive layer 111 by detecting a change in the intensity, wavelength or phase shift of the light reflected from the substrate 110 when the conductive material is removed. Alternatively, the sensor 251 can emit and detect reflections of radiation having other wavelengths, for example, x-ray radiation. In still another embodiment, the sensor 251 can measure a change in resistance or capacitance of the conductive layer 111 between two selected points. In a further aspect of this embodiment, one or both of the electrodes 220 can perform the function of the sensor 251 (as well as the material removal function described above), eliminating the need for a separate sensor 251. In still further embodiments, the sensor 251 can detect a change in the voltage and/or current drawn from the current supply 221 as the conductive layer 111 is removed.

In any of the embodiments described above with reference to FIG. 4, the sensor 251 can be positioned apart from the electrolyte 231 because the electrolyte 231 is concentrated in the interface region 239 between the electrodes 220 and the conductive layer 111. Accordingly, the accuracy with which the sensor 251 determines the progress of the electrolytic process can be improved because the electrolyte 231 will be less likely to interfere with the operation of the sensor 251. For example, when the sensor 251 is an optical sensor, the electrolyte 231 will be less likely to distort the radiation reflected from the surface of the substrate 110 because the sensor 251 is positioned away from the interface region 239.

Another feature of an embodiment of the apparatus 260 described above with reference to FIG. 4 is that the electrolyte 231 supplied to the interface region 239 is continually replenished, either with a reconditioned electrolyte or a fresh electrolyte. An advantage of this feature is that the electrochemical reaction between the electrodes 220 and the conductive layer 111 can be maintained at a high and consistent level.

Figure 5:
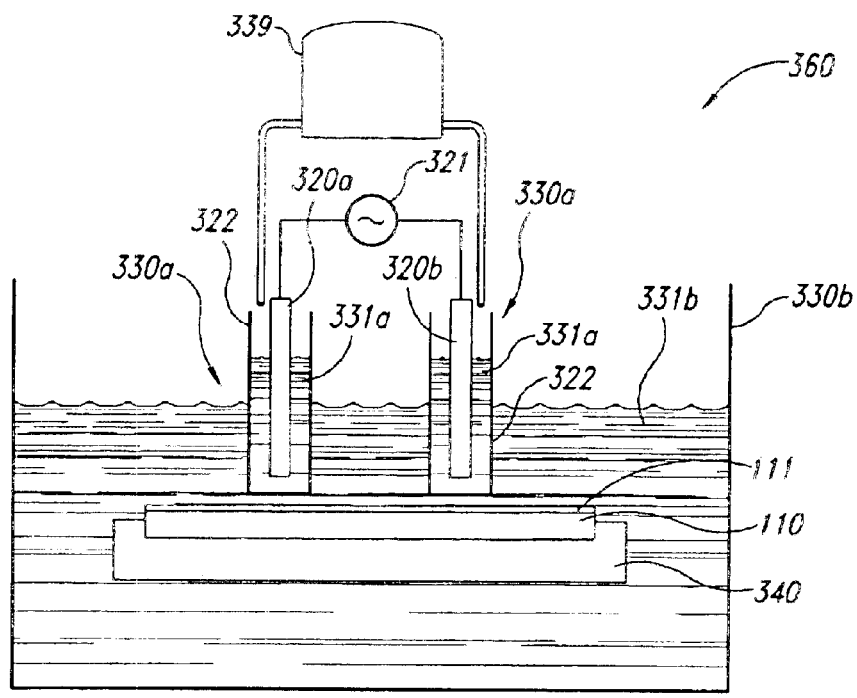
FIG. 5 is a partially schematic, side elevational view of an apparatus that includes two electrolytes in accordance with still another embodiment of the invention.

FIG. 5 is a partially schematic, side elevational view of an apparatus 360 that directs alternating current to the substrate 110 through a first electrolyte 331a and a second electrolyte 331b. In one aspect of this embodiment, the first electrolyte 331a is disposed in two first electrolyte vessels 330a, and the second electrolyte 331b is disposed in a second electrolyte vessel 330b. The first electrolyte vessels 330a are partially submerged in the second electrolyte 331b. The apparatus 360 can further include electrodes 320, shown as a first electrode 320a and a second electrode 320b, each coupled to a current supply 321 and each housed in one of the first electrolyte vessels 330a. Alternatively, one of the electrodes 320 can be coupled to ground. The electrodes 320 can include materials such as silver, platinum, copper and/or other materials, and the first electrolyte 331a can include sodium chloride, potassium chloride, copper sulfate and/or other electrolytes that are compatible with the material forming the electrodes 320.

In one aspect of this embodiment, the first electrolyte vessels 330a include a flow restrictor 322, such as a permeable isolation membrane formed from Teflon™, sintered materials such as sintered glass, quartz or sapphire, or other suitable porous materials that allow ions to pass back and forth between the first electrolyte vessels 330a and the second electrolyte vessel 330b, but do not allow the second electrolyte 330b to pass inwardly toward the electrodes 320 (for example, in a manner generally similar to a salt bridge). Alternatively, the first electrolyte 331a can be supplied to the electrode vessels 330a from a first electrolyte source 339 at a pressure and rate sufficient to direct the first electrolyte 331a outwardly through the flow restrictor 322 without allowing the first electrolyte 331a or the second electrolyte 330b to return through the flow restrictor 322. In either embodiment, the second electrolyte 331b remains electrically coupled to the electrodes 320 by the flow of the first electrolyte 331a through the restrictor 322.

In one aspect of this embodiment, the apparatus 360 can also include a support member 340 that supports the substrate 110 with the conductive layer 111 facing toward the electrodes 320. For example, the support member 340 can be positioned in the second electrolyte vessel 330b. In a further aspect of this embodiment, the support member 340 and/or the electrodes 320 can be movable relative to each other by one or more drive units (not shown).

One feature of an embodiment of the apparatus 360 described above as reference to FIG. 5 is that the first electrolyte 331a can be selected to be compatible with the electrodes 320. An advantage of this feature is that the first electrolyte 331a can be less likely than conventional electrolytes to degrade the electrodes 320. Conversely, the second electrolyte 331b can be selected without regard to the effect it has on the electrodes 320 because it is chemically isolated from the electrodes 320 by the flow restrictor 322. Accordingly, the second electrolyte 331b can include hydrochloric acid or another agent that reacts aggressively with the conductive layer 111 of the substrate 110.

Figure 6:
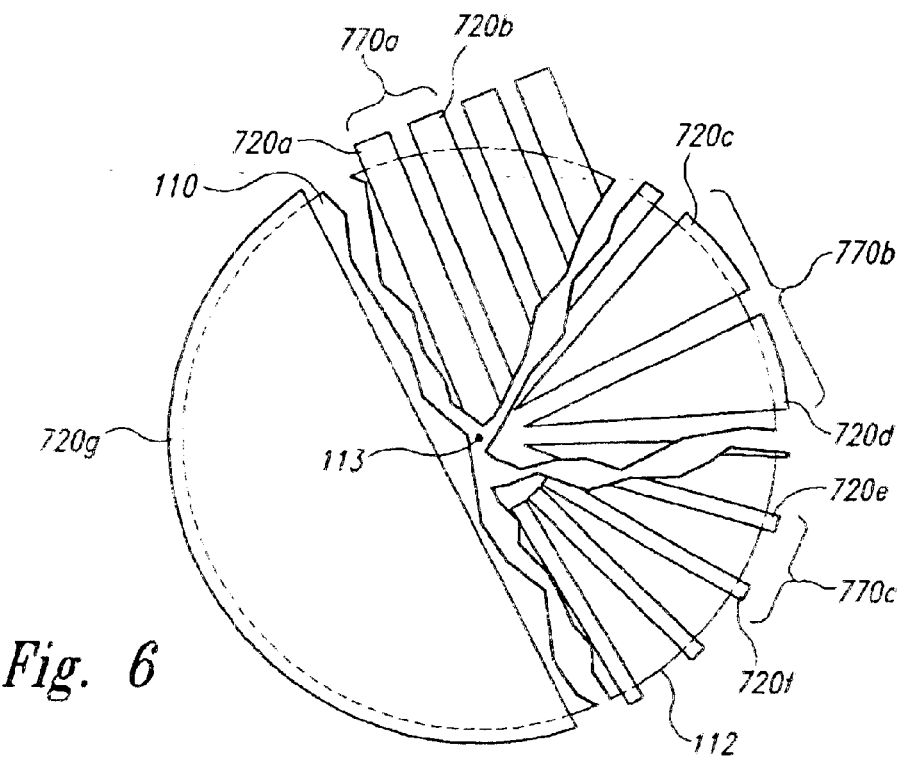
FIG. 6 is a partially schematic, plan view of a substrate adjacent to a plurality of electrodes in accordance with still further embodiments of the invention.

FIG. 6 is a top plan view of the microelectronic substrate 110 positioned beneath a plurality of electrodes having shapes and configurations in accordance with several embodiments of the invention. For purposes of illustration, several different types of electrodes are shown positioned proximate to the same microelectronic substrate 110; however, in practice, electrodes of the same type can be positioned relative to a single microelectronic substrate 110.

In one embodiment, electrodes 720a and 720b can be grouped to form an electrode pair 770a, with each electrode 720a and 720b coupled to an opposite terminal of a current supply 121 (FIG. 3). The electrodes 770a and 770b can have an elongated or strip-type shape and can be arranged to extend parallel to each other over the diameter of the substrate 110. The spacing between adjacent electrodes of an electrode pair 370a can be selected to direct the electrical current into the substrate 110, as described above with reference to FIG. 3.

In an alternate embodiment, electrodes 720c and 720d can be grouped to form an electrode pair 770b, and each electrode 720c and 720d can have a wedge or "pie" shape that tapers inwardly toward the center of the microelectronic substrate 110. In still another embodiment, narrow, strip-type electrodes 720e and 720f can be grouped to form electrode pairs 770c, with each electrode 720e and 720f extending radially outwardly from the center 113 of the microelectronic substrate 110 toward the periphery 112 of the microelectronic substrate 110.

In still another embodiment, a single electrode 720g can extend over approximately half the area of the microelectronic substrate 110 and can have a semicircular planform shape. The electrode 720g can be grouped with another electrode (not shown) having a shape corresponding to a mirror image of the electrode 720g, and both electrodes can be coupled to the current source 121 to provide alternating current to the microelectronic substrate in any of the manners described above with reference to FIGS. 3–5.

Figure 7:
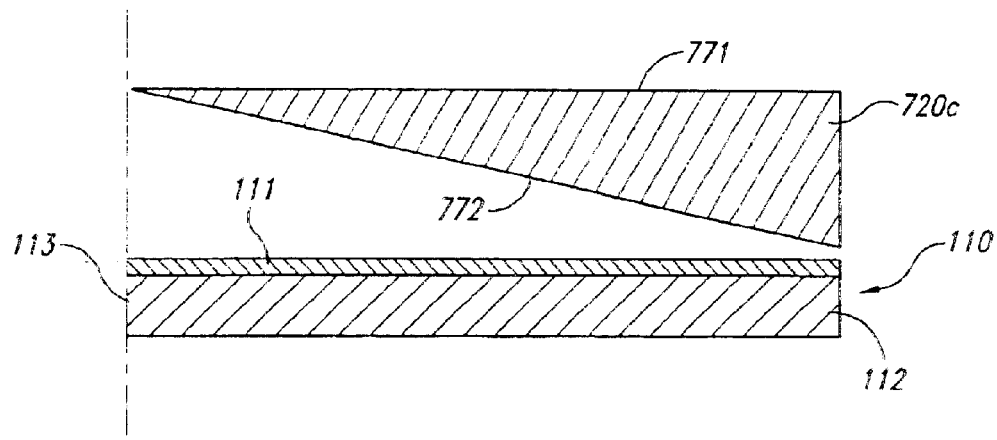
FIG. 7 is a cross-sectional, side elevational view of an electrode and a substrate in accordance with yet another embodiment of the invention.

FIG. 7 is a partially schematic, cross-sectional side elevational view of a portion of the substrate 110 positioned beneath the electrode 720c described above with reference to FIG. 6. In one aspect of this embodiment, the electrode 720c has an upper surface 771 and a lower surface 772 opposite the upper surface 771 and facing the conductive layer 111 of the substrate 110. The lower surface 772 can taper downwardly from the center 113 of the substrate 110 toward the perimeter 112 of the substrate 110 in one aspect of this embodiment to give the electrode 720c a wedge-shaped profile. Alternatively, the electrode 720c can have a plate-type configuration with the lower surface 772 positioned as shown in FIG. 7 and the upper surface 771 parallel to the lower surface 772. One feature of either embodiment is that the electrical coupling between the electrode 720c and the substrate 110 can be stronger toward the periphery 112 of the substrate 110 than toward the center 113 of the substrate 110. This feature can be advantageous when the periphery 112 of the substrate 110 moves relative to the electrode 720c at a faster rate than does the center 113 of the substrate 110, for example, when the substrate 110 rotates about its center 113. Accordingly, the electrode 720c can be shaped to account for relative motion between the electrode and the substrate 110.

In other embodiments, the electrode 720c can have other shapes. For example, the lower surface 772 can have a curved rather than a flat profile. Alternatively, any of the electrodes described above with reference to FIG. 6 (or other electrodes having shapes other than those shown in FIG. 6) can have a sloped or curved lower surface. In still further embodiments, the electrodes can have other shapes that account for relative motion between the electrodes and the substrate 110.

Figure 8A:
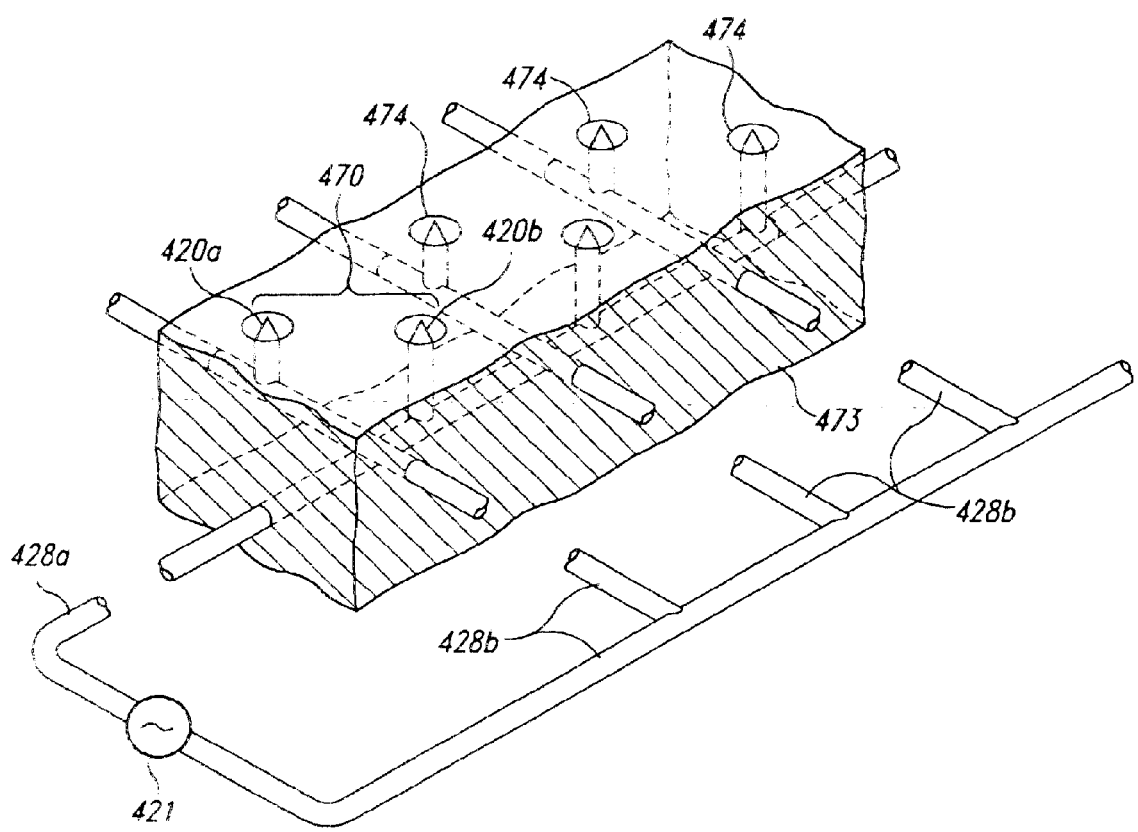
FIG. 8A is a partially schematic, isometric view of a portion of a support for housing electrode pairs in accordance with still another embodiment of the invention.

FIG. 8A is a partially schematic view of an electrode support 473 for supporting a plurality of electrodes in accordance with another embodiment of the invention. In one aspect of this embodiment, the electrode support 473 can include a plurality of electrode apertures 474, each of which houses either a first electrode 420a or a second electrode 420b. The first electrodes 420a are coupled through the apertures 474 to a first lead 428a and the second electrodes 420b are coupled to a second lead 428b. Both of the leads 428a and 428b are coupled to a current supply 421. Accordingly, each pair 470 of first and second electrodes 420a and 420b defines part of a circuit that is completed by the substrate 110 and the electrolyte(s) described above with reference to FIGS. 3–5.

In one aspect of this embodiment, the first lead 428a can be offset from the second lead 428b to reduce the likelihood for short circuits and/or capacitive coupling between the leads. In a further aspect of this embodiment, the electrode support 473 can have a configuration generally similar to any of those described above with reference to FIGS. 1–7. For example, any of the individual electrodes (e.g., 320a, 320c, 320e, or 320g) described above with reference to FIG. 6 can be replaced with an electrode support 473 having the same overall shape and including a plurality of apertures 474, each of which houses one of the first electrodes 420a or the second electrodes 420b. In another aspect of this embodiment, the electrode support 473 can be configured to mechanically remove material from the microelectronic substrate, for example, in a manner generally similar to that described below with reference to FIGS. 9–11 and 13–18.

In still a further aspect of this embodiment, the electrode pairs 470 shown in FIG. 8A can be arranged in a manner that corresponds to the proximity between the electrodes 420a, 420b and the microelectronic substrate 110 (FIG. 7), and/or the electrode pairs 470 can be arranged to correspond to the rate of relative motion between the electrodes 420a, 420b and the microelectronic substrate 110. For example, the electrode pairs 470 can be more heavily concentrated in the periphery 112 of the substrate 110 or other regions where the relative velocity between the electrode pairs 470 and the substrate 110 is relatively high (see FIG. 7). Accordingly, the increased concentration of electrode pairs 470 can provide an increased electrolytic current to compensate for the high relative velocity. Furthermore, the first electrode 420a and the second electrode 420b of each electrode pair 470 can be relatively close together in regions (such as the periphery 112 of the substrate 110) where the electrodes are close to the conductive layer 111 (see FIG. 7) because the close proximity to the conductive layer 111 reduces the likelihood for direct electrical coupling between the first electrode 420a and the second electrode 420b. In still a further aspect of this embodiment, the amplitude, frequency and/or waveform shape supplied to different electrode pairs 470 can vary depending on factors such as the spacing between the electrode pair 470 and the microelectronic substrate 110, and the relative velocity between the electrode pair 470 and the microelectronic substrate 110.

Figure 8B:
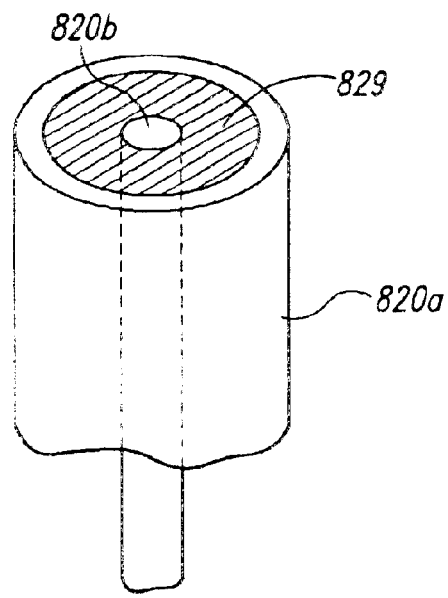
FIGS. 8B–8C are isometric views of electrodes in accordance with still further embodiments of the invention.
Figure 8C:
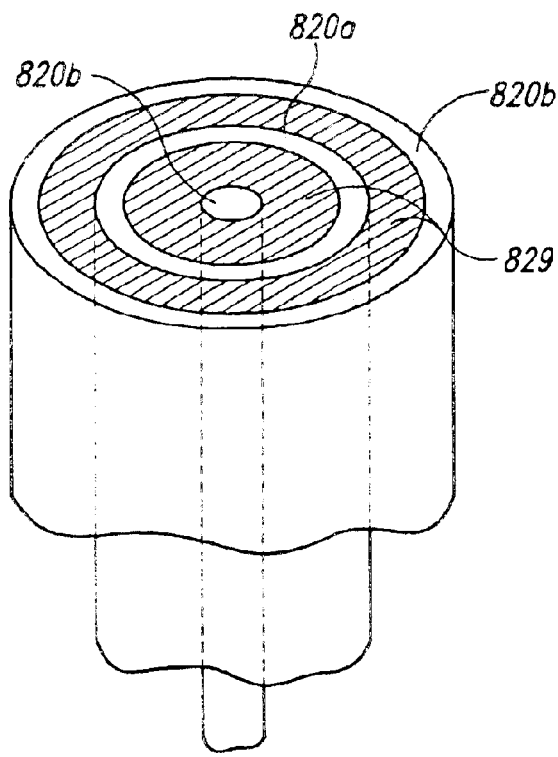

FIGS. 8B–8C illustrate electrodes 820 (shown as first electrodes 820a and second electrodes 820b) arranged concentrically in accordance with still further embodiments of the invention. In one embodiment shown in FIG. 8B, the first electrode 820a can be positioned concentrically around the second electrode 820b, and a dielectric material 829 can be disposed between the first electrode 820a and the second electrode 820b. The first electrode 820a can define a complete 360° arc around the second electrode 820b, as shown in FIG. 8B, or alternatively, the first electrode 820a can define an arc of less than 360°.

In another embodiment, shown in FIG. 8C, the first electrode 820A can be concentrically disposed between two second electrodes 820b, with the dielectric material 829 disposed between neighboring electrodes 820. In one aspect of this embodiment, current can be supplied to each of the second electrodes 820b with no phase shifting. Alternatively, the current supplied to one second electrode 820b can be phase-shifted relative to the current supplied to the other second electrode 820b. In a further aspect of the embodiment, the current supplied to each second electrode 820b can differ in characteristics other than phase, for example, amplitude.

One feature of the electrodes 820 described above with respect to FIGS. 8B–8C is that the first electrode 820a can shield the second electrode(s) 820b from interference from other current sources. For example, the first electrode 820a can be coupled to ground to shield the second electrodes 820b. An advantage of this arrangement is that the current applied to the substrate 110 (FIG. 7) via the electrodes 820 can be more accurately controlled.

Figure 9:
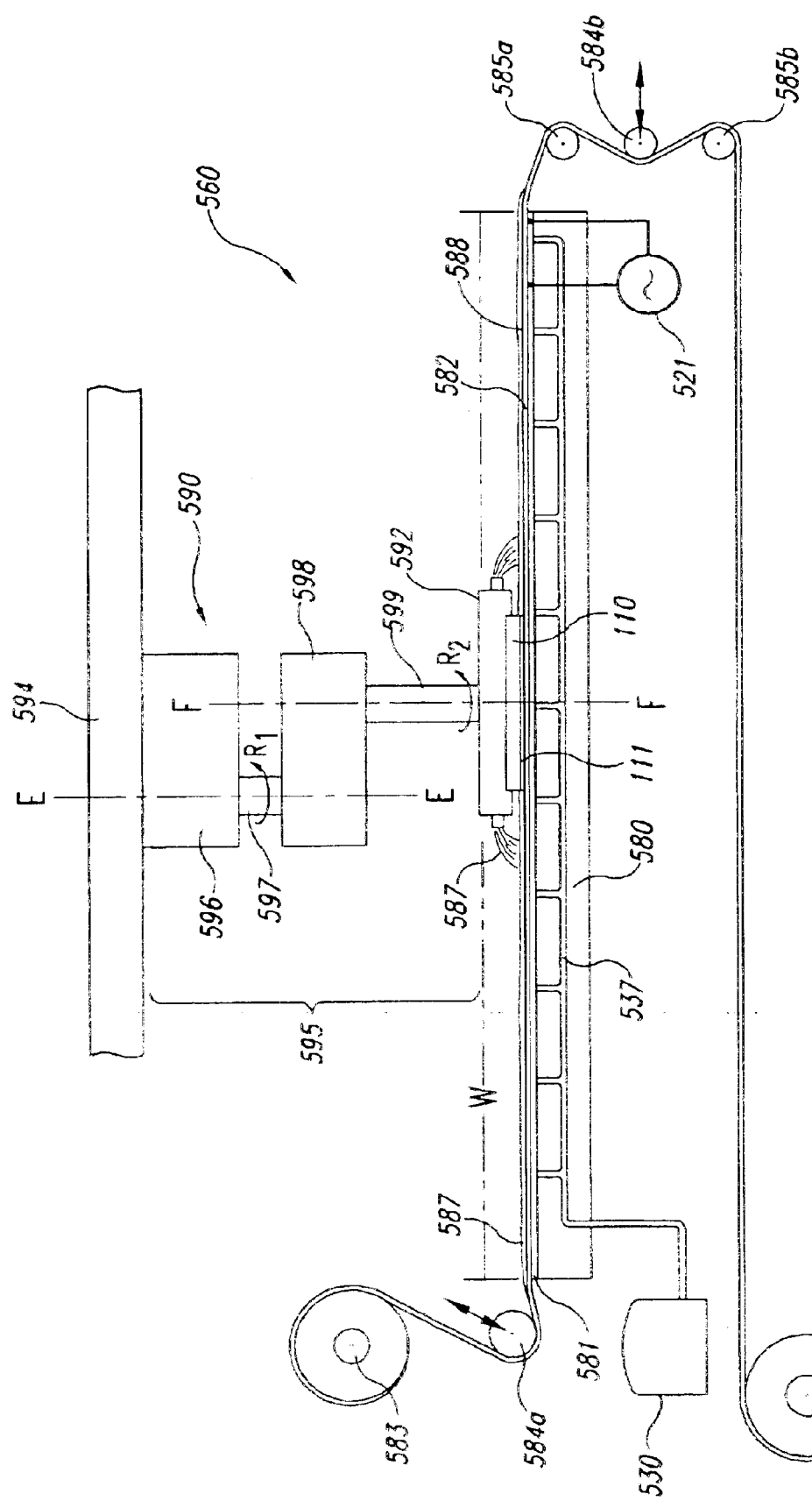
FIG. 9 is a partially schematic, side elevational view of an apparatus for both planarizing and electrolytically processing microelectronic substrates in accordance with yet another embodiment of the invention.

FIG. 9 schematically illustrates an apparatus 560 for both planarizing and electrolytically processing the microelectronic substrate 110 in accordance with an embodiment of the invention. In one aspect of this embodiment, the apparatus 560 has a support table 580 with a top-panel 581 at a workstation where an operative portion "W" of a planarizing pad 582 is positioned. The top-panel 581 is generally a rigid plate to provide a flat, solid surface to which a particular section of the planarizing pad 582 may be secured during planarization.

The apparatus 560 can also have a plurality of rollers to guide, position and hold the planarizing pad 582 over the top-panel 581. The rollers can include a supply roller 583, first and second idler rollers 584a and 584b, first and second guide rollers 585a and 585b, and a take-up roller 586. The supply roller 583 carries an unused or pre-operative portion of the planarizing pad 582, and the take-up roller 583 carries a used or post-operative portion of the planarizing pad 582. Additionally, the first idler roller 584a and the first guide roller 585a can stretch the planarizing pad 582 over the top-panel 581 to hold the planarizing pad 582 stationary during operation. A motor (not shown) drives at least one of the supply roller 583 and the take-up roller 586 to sequentially advance the planarizing pad 582 across the top-panel 581. Accordingly, clean pre-operative sections of the planarizing pad 582 may be quickly substituted for used sections to provide a consistent surface for planarizing and/or cleaning the substrate 110.

The apparatus 560 can also have a carrier assembly 590 that controls and protects the substrate 110 during planarization. The carrier assembly 590 can include a substrate holder 592 to pick up, hold and release the substrate 110 at appropriate stages of the planarizing process. The carrier assembly 590 can also have a support gantry 594 carrying a drive assembly 595 that can translate along the gantry 594. The drive assembly 595 can have an actuator 596, a drive shaft 597 coupled to the actuator 596, and an arm 598 projecting from the drive shaft 597. The arm 598 carries the substrate holder 592 via a terminal shaft 599 such that the drive assembly 595 orbits the substrate holder 592 about an axis E—E (as indicated by arrow "$R_1$"). The terminal shaft 599 may also rotate the substrate holder 592 about its central axis F—F (as indicated by arrow "$R_2$").

The planarizing pad 582 and a planarizing solution 587 define a planarizing medium that mechanically and/or chemically-mechanically removes material from the surface of the substrate 110. The planarizing pad 582 used in the apparatus 560 can be a fixed-abrasive planarizing pad in which abrasive particles are fixedly bonded to a suspension medium. Accordingly, the planarizing solution 587 can be a "clean solution" without abrasive particles because the abrasive particles are fixedly distributed across a planarizing surface 588 of the planarizing pad 582. In other applications, the planarizing pad 582 may be a non-abrasive pad without abrasive particles, and the planarizing solution 587 can be a slurry with abrasive particles and chemicals to remove material from the substrate 110.

To planarize the substrate 110 with the apparatus 560, the carrier assembly 590 presses the substrate 110 against the planarizing surface 588 of the planarizing pad 582 in the presence of the planarizing solution 587. The drive assembly 595 then orbits the substrate holder 592 about the axis E—E and optionally rotates the substrate holder 592 about the axis F—F to translate the substrate 110 across the planarizing surface 588. As a result, the abrasive particles and/or the chemicals in the planarizing medium remove material from the surface of the substrate 110 in a chemical and/or chemical-mechanical planarization (CMP) process. Accordingly, the planarizing pad 582 can smooth the substrate 110 by removing rough features projecting from the conductive layer 111 of the substrate 110.

In a further aspect of this embodiment, the apparatus 560 can include an electrolyte supply vessel 530 that delivers an electrolyte to the planarizing surface of the planarizing pad 582 with a conduit 537, as described in greater detail with reference to FIG. 10. The apparatus 560 can further include a current supply 521 coupled to the support table 580 and/or the top-panel 581 to supply an electrical current to electrodes positioned in the support table 580 and/or the top-panel 581. Accordingly, the apparatus 560 can electrolytically remove material from the conductive layer 111 in a manner similar to that described above with reference to FIGS. 1–8C.

In one aspect of an embodiment of the apparatus 560 described above with reference to FIG. 9, material can be sequentially removed from the conductive layer 111 of the substrate 110 first by an electrolytic process and then by a CMP process. For example, the electrolytic process can remove material from the conductive layer 111 in a manner that roughens the conductive layer 111. After a selected period of electrolytic processing time has elapsed, the electrolytic processing operation can be halted and additional material can be removed via CMP processing. Alternatively, the electrolytic process and the CMP process can be conducted simultaneously. In either of these processing arrangements, one feature of an embodiment of the apparatus 560 described above with reference to FIG. 9 is that the same apparatus 560 can planarize the substrate 110 via CMP and remove material from the substrate 110 via an electrolytic process. An advantage of this arrangement is that the substrate 110 need not be moved from one apparatus to another to undergo both CMP and electrolytic processing.

Another advantage of an embodiment of the apparatus 560 described above with reference to FIG. 9 is that the processes, when used in conjunction with each other, is expected to remove material from the substrate 110 more quickly and accurately than some conventional processes. For example, as described above, the electrolytic process can remove relatively large amounts of material in a manner that roughens the microelectronic substrate 110, and the planarizing process can remove material on a finer scale in a manner that smoothes and/or flattens the microelectronic substrate 110.

Figure 10:
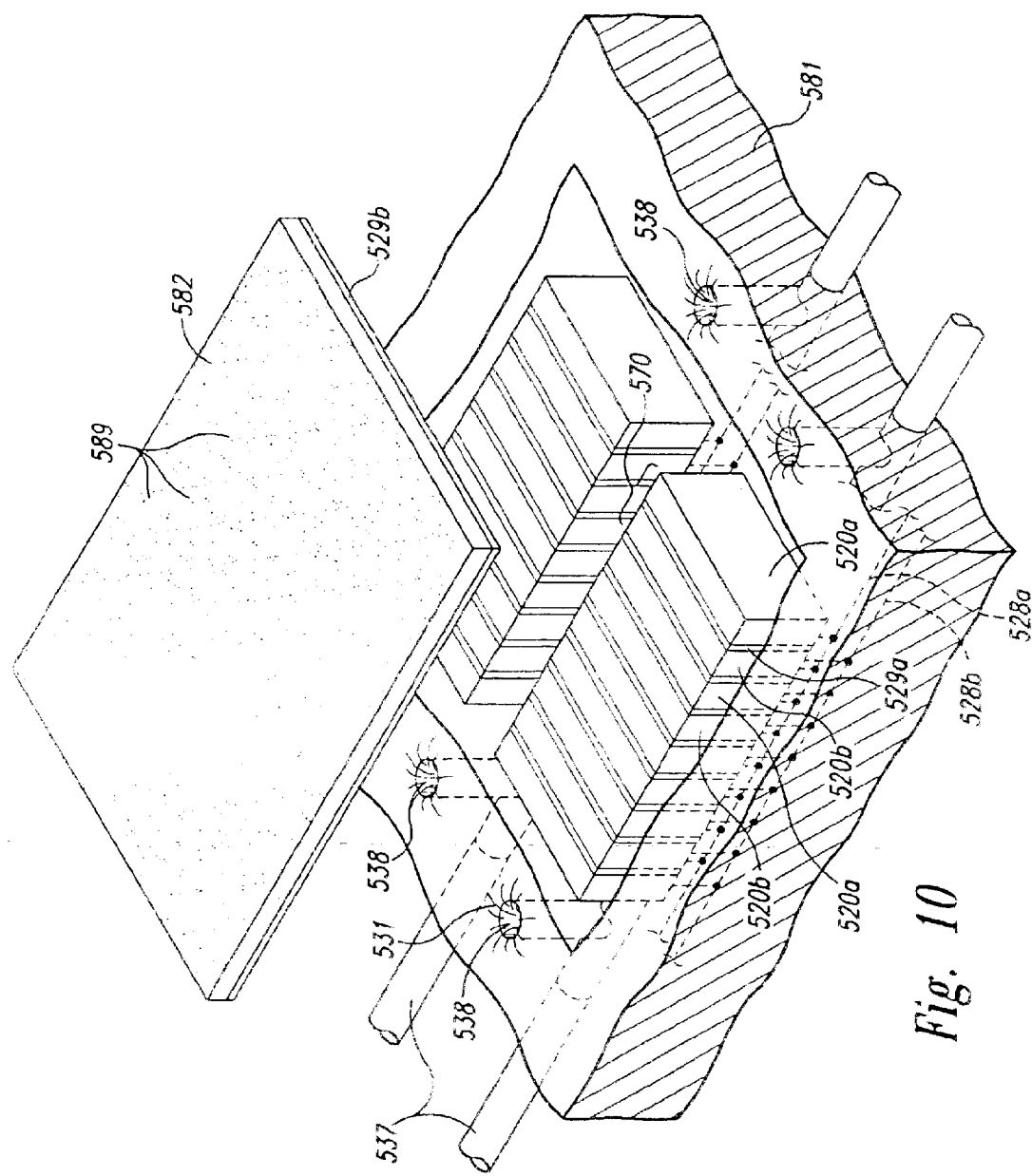
FIG. 10 is a partially schematic, partially exploded isometric view of a planarizing pad and a plurality of electrodes in accordance with still another embodiment of the invention.

FIG. 10 is a partially exploded, partially schematic isometric view of a portion of the apparatus 560 described above with reference to FIG. 9. In one aspect of an embodiment shown in FIG. 10, the top-panel 581 houses a plurality of electrode pairs 570, each of which includes a first electrode 520a and a second electrode 520b. The first electrodes 520a are coupled to a first lead 528a and the second electrodes 520b are coupled to a second lead 528b. The first and second leads 528a and 528b are coupled to the current source 521 (FIG. 9). In one aspect of this embodiment, the first electrode 520a can be separated from the second electrodes 520b by an electrode dielectric layer 529a that includes Teflon™ or another suitable dielectric material. The electrode dielectric layer 529a can accordingly control the volume and dielectric constant of the region between the first and second electrodes 520a and 520b to control electrical coupling between the electrodes.

The electrodes 520a and 520b can be electrically coupled to the microelectronic substrate 110 (FIG. 9) by the planarizing pad 582. In one aspect of this embodiment, the planarizing pad 582 is saturated with an electrolyte 531 supplied by the supply conduits 537 through apertures 538 in the top-panel 581 just beneath the planarizing pad 582. Accordingly, the electrodes 520a and 520b are selected to be compatible with the electrolyte 531. In an alternate arrangement, the electrolyte 531 can be supplied to the planarizing pad 582 from above (for example, by disposing the electrolyte 531 in the planarizing liquid 587) rather than through the top-panel 581. Accordingly, the planarizing pad 582 can include a pad dielectric layer 529b positioned between the planarizing pad 582 and the electrodes 520a and 520b. When the pad dielectric layer 529b is in place, the electrodes 520a and 520b are isolated from physical contact with the electrolyte 531 and can accordingly be selected from materials that are not necessarily compatible with the electrolyte 531.

In either of the embodiments described above with reference to FIG. 10, the planarizing pad 582 can provide several advantages over some conventional electrolytic arrangements. For example, the planarizing pad 582 can uniformly separate the electrodes 520a and 520b from the microelectronic substrate 110 (FIG. 9), which can increase the uniformity with which the electrolytic process removes material from the conductive layer 111 (FIG. 9). The planarizing pad 582 can also have abrasive particles 589 for planarizing the microelectronic substrate 110 in the manner described above with reference to FIG. 9. Furthermore, the planarizing pad 582 can filter carbon or other material that erodes from the electrodes 520a and 520b to prevent the electrode material from contacting the microelectronic substrate 110. Still further, the planarizing pad 582 can act as a sponge to retain the electrolyte 531 in close proximity to the microelectronic substrate 110.

FIG. 11 is a partially schematic, cross-sectional side elevational view of a rotary apparatus 660 for planarizing and/or electrolytically processing the microelectronic substrate 110 in accordance with another embodiment of the invention. In one aspect of this embodiment, the apparatus 660 has a generally circular platen or table 680, a carrier assembly 690, a planarizing pad 682 positioned on the table 680, and a planarizing liquid 687 on the planarizing pad 682. The planarizing pad 682 can be a fixed abrasive planarizing pad or, alternatively, the planarizing liquid 687 can be a slurry having a suspension of abrasive elements and the planarizing pad 682 can be a non-abrasive pad. A drive assembly 695 rotates (arrow "G") and/or reciprocates (arrow "H") the platen 680 to move the planarizing pad 682 during planarization.

The carrier assembly 690 controls and protects the microelectronic substrate 110 during planarization. The carrier assembly 690 typically has a substrate holder 692 with a pad 694 that holds the microelectronic substrate 110 via suction. A drive assembly 696 of the carrier assembly 690 typically rotates and/or translates the substrate holder 692 (arrows "I" and "J," respectively). Alternatively, the substrate holder 692 may include a weighted, free-floating disk (not shown) that slides over the planarizing pad 682.

To planarize the microelectronic substrate 110 with the apparatus 660, the carrier assembly 690 presses the microelectronic substrate 110 against a planarizing surface 688 of the planarizing pad 682. The platen 680 and/or the substrate holder 692 then move relative to one another to translate the microelectronic substrate 110 across the planarizing surface 688. As a result, the abrasive particles in the planarizing pad 682 and/or the chemicals in the planarizing liquid 687 remove material from the surface of the microelectronic substrate 110.

The apparatus 660 can also include a current source 621 coupled with leads 628a and 628b to one or more electrode pairs 670 (one of which is shown in FIG. 11). The electrode pairs 670 can be integrated with the platen 680 in generally the same manner with which the electrodes 520a and 520b (FIG. 10) are integrated with the top panel 581 (FIG. 10). Alternatively, the electrode pairs 670 can be integrated with the planarizing pad 682. In either embodiment, the electrode pairs 670 can include electrodes having shapes and configurations generally similar to any of those described above with reference to FIGS. 3–10 to electrolytically remove conductive material from the microelectronic substrate 110. The electrolytic process can be carried out before, during or after the CMP process, as described above with reference to FIG. 9.

FIG. 12A is a schematic circuit representation of some of the components described above with reference to FIG. 10. The circuit analogy can also apply to any of the arrangements described above with reference to FIGS. 3–11. As shown schematically in FIG. 12A, the current source 521 is coupled to the first electrode 520a and the second electrode 520b with leads 528a and 528b respectively. The electrodes 520a and 520b are coupled to the microelectronic substrate 110 with the electrolyte 531 in an arrangement that can be represented schematically by two sets of parallel capacitors and resistors. A third capacitor and resistor schematically indicates that the microelectronic substrate 110 "floats" relative to ground or another potential.

In one aspect of an embodiment shown in FIG. 12A, the current source 521 can be coupled to an amplitude modulator 522 that modulates the signal produced by the current source 521, as is shown in FIG. 12B. Accordingly, the current source 521 can generate a high-frequency wave 804, and the amplitude modulator 522 can superimpose a low-frequency wave 802 on the high-frequency wave 804. For example, the high-frequency wave 804 can include a series of positive or negative voltage spikes contained within a square wave envelope defined by the low-frequency wave 802. Each spike of the high-frequency wave 804 can have a relatively steep rise time slope to transfer charge through the dielectric to the electrolyte, and a more gradual fall time slope. The fall time slope can define a straight line, as indicated by high-frequency wave 804, or a curved line, as indicated by high-frequency wave 804a. In other embodiments, the high-frequency wave 804 and the low-frequency wave 802 can have other shapes depending, for example, on the particular characteristics of the dielectric material and electrolyte adjacent to the electrodes 420, the characteristics of the substrate 110, and/or the target rate at which material is to be removed from the substrate 110.

An advantage of this arrangement is that the high frequency signal can transmit the required electrical energy from the electrodes 520a and 520b to the microelectronic substrate 110, while the low frequency superimposed signal can more effectively promote the electrochemical reaction between the electrolyte 531 and the conductive layer 111 of the microelectronic substrate 110. Accordingly, any of the embodiments described above with reference to FIGS. 3–11 and/or below with reference to FIGS. 13–18 can include an amplitude modulator in addition to a current source.

Figure 13:
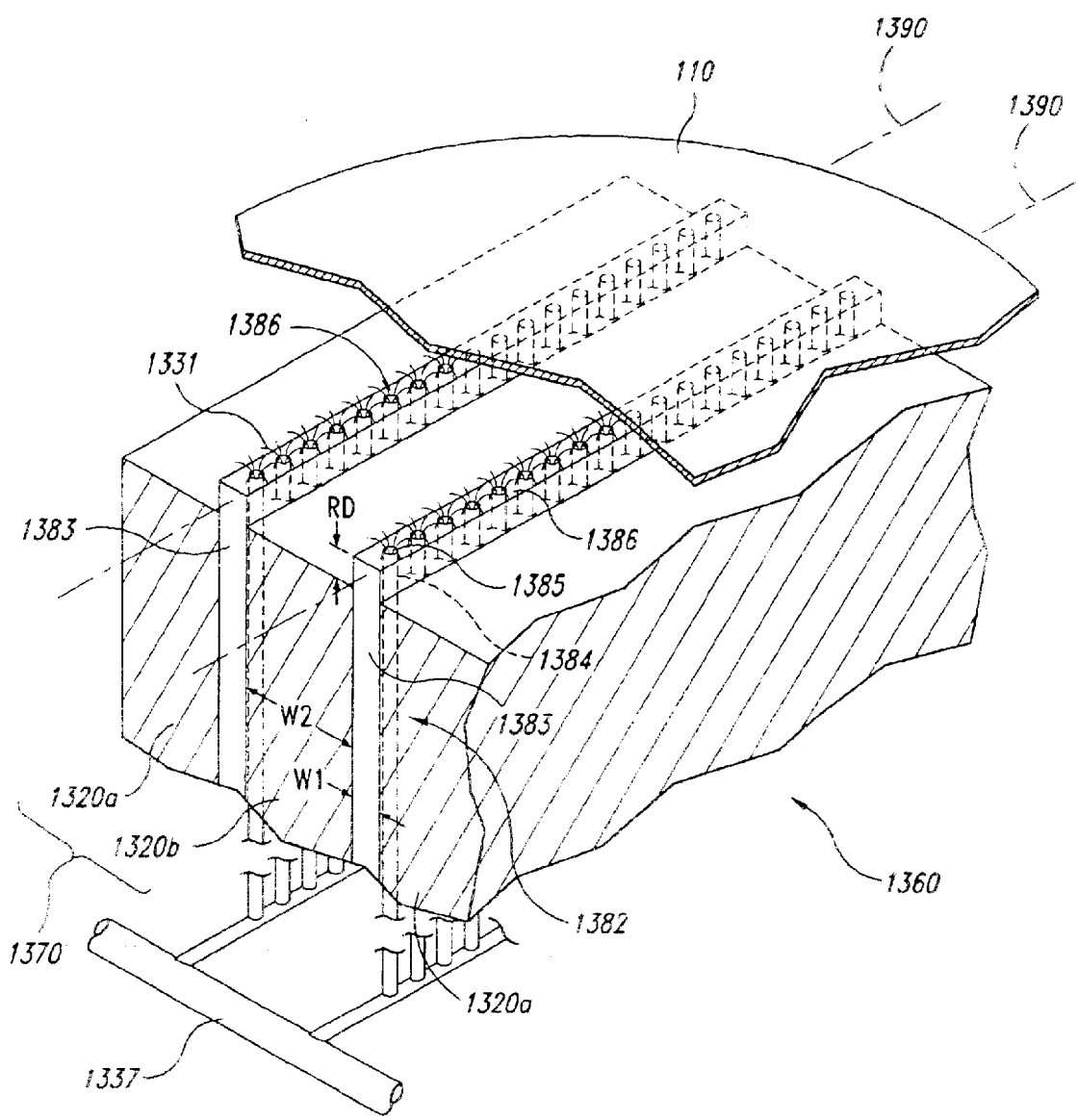
FIG. 13 is an isometric, partially schematic, partially cutaway view of a portion of an apparatus having electrodes and a polishing medium in accordance with an embodiment of the invention.

FIG. 13 is a partially schematic, partially broken isometric view of a portion of an apparatus 1360 configured to electromechanically and/or electrochemically-mechanically remove material from the microelectronic substrate 110 in accordance with another embodiment of the invention. In one aspect of this embodiment, the apparatus 1360 includes a polishing medium 1382 and a plurality of electrode pairs 1370. Each electrode pair 1370 can include a first electrode 1320a and a second electrode 1320b, elongated along parallel axes 1390. The electrodes 1320a and 1320b can each have a width W1 transverse to the axes 1390, and can be separated by polishing pad portions 1383. Each polishing pad portion 1383 can have a width W2 transverse to the axes 1390, and can have an elongated polishing surface 1386. In one aspect of this embodiment, the polishing surfaces 1386 of the pad portions 1383 project beyond the electrodes 1320a, 1320b. Accordingly, the electrodes 1320a, 1320b can be recessed from the polishing surfaces 1386 by a recessed distance RD, while the polishing surfaces 1386 contact the microelectronic substrate 110 to mechanically, electromechanically and/or electrochemically-mechanically polish and/or planarize or otherwise remove material from the microelectronic substrate 110. In one embodiment, the recess distance RD can have a value of from about 0.1 mm to about 10 mm. In other embodiments, the recess distance RD can have other values, depending, for example, on the particular geometries of the electrodes 1320a, 1320b and the pad portions 1383.

In another aspect of this embodiment, the pad portions 1383 can include flow passages 1384, each of which has an aperture 1385 proximate to the corresponding polishing surface 1386. The flow passages 1384 are coupled to a supply conduit 1337, which can in turn be coupled to an electrolytic fluid reservoir (not shown in FIG. 13). In one embodiment, the flow passages 1384 can be discrete linear passages between the conduit 1337 and the polishing surface 1386, as shown in FIG. 13. In another embodiment, the pad portions 1383 can be generally porous, and the flow passages 1384 can include a network of interconnected, convoluted paths. In any of these embodiments, the flow passages 1384 can provide an electrolyte 1331 (such as an electrolytic fluid) at least proximate to an interface between the microelectronic substrate 110 and the polishing surfaces 1386.

In one embodiment, the pad portions 1383 can include polyurethane materials or other suitable materials, such as those incorporated in polishing pads available from Rodel, Inc. of Phoenix, Ariz. In one aspect of this embodiment, the width W1 of the pad portions 1383 can be less than the width W2 of the interstitial electrodes 1320a, 1320b to allow for sufficient electrical communication between the electrodes 1320a, 1320b and the microelectronic substrate 110. In other embodiments, the electrodes 1320a, 1320b and the polishing pad portions 1383 can have other relative dimensions depending on the particular geometries of these components.

One feature of an embodiment of the apparatus 1360 shown in FIG. 13 is that the electrodes 1320a, 1320b are recessed from the polishing surfaces 1386. Accordingly, the electrodes 1320a, 1320b can be in electrical contact with the microelectronic substrate 110 via the electrolyte 1331 without coming into direct physical contact with the microelectronic substrate 110. In one aspect of this embodiment, the surfaces of the electrodes 1320a, 1320b facing toward the microelectronic substrate 110 are exposed to provide direct electrical contact with the electrolyte 1331. In other embodiments, the electrodes 1320a, 1320b can be enclosed or partially enclosed with a protective film or other structure that can protect the electrodes 1320a, 1320b while still permitting electrical communication between the electrodes 1320a, 1320b and the microelectronic substrate 110 via the electrolyte 1331.

Another feature of an embodiment of the apparatus 1360 shown in FIG. 13 is that the electrolyte 1331 can be provided at least proximate to (and in some embodiments, directly to) an interface between the polishing surfaces 1386 and the microelectronic substrate 110. Accordingly, the electrolyte 1331 can lubricate the interface between the microelectronic substrate 110 and the polishing surfaces 1386, chemically promote material removal from the microelectronic substrate 110, and/or convey removed particles away from the interface. At the same time, the electrolyte 1331 can fill the recesses between neighboring pad portions 1383 to provide electrical communication between the electrodes 1320a, 1320b and the microelectronic substrate 110, thus facilitating electrically removing material from the microelectronic substrate 110.

Figure 14:
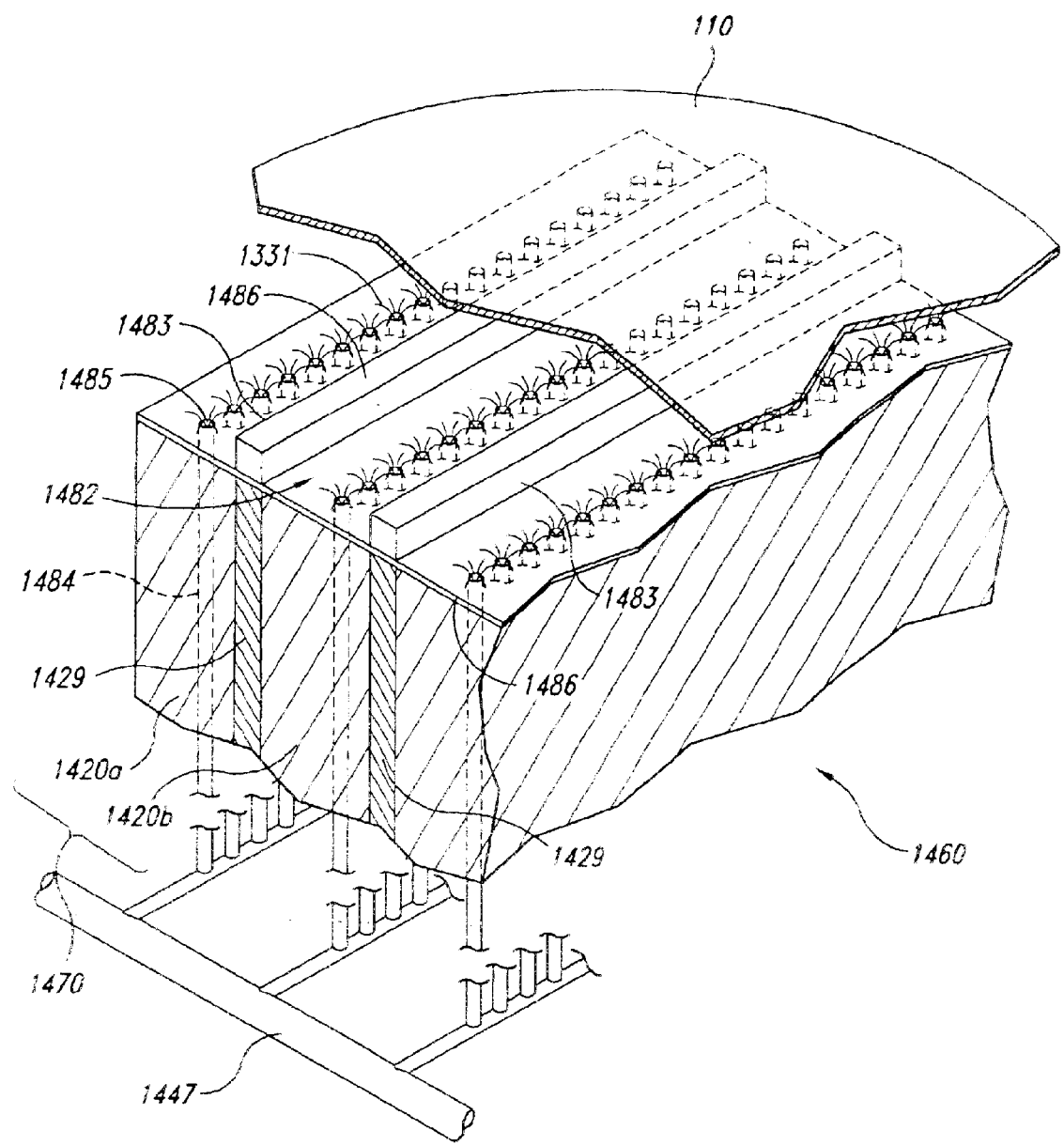
FIG. 14 is an isometric, partially schematic, partially cutaway view of an apparatus having electrodes and a polishing medium in accordance with another embodiment of the invention.

FIG. 14 is a partially schematic, partially broken isometric view of a portion of an apparatus 1460 configured in accordance with another embodiment of the invention. In one aspect of this embodiment, the apparatus 1460 includes electrode pairs 1470 with first electrodes 1420a and second electrodes 1420b. The electrodes 1420a, 1420b include flow passages 1484 having apertures 1485 for providing the electrolyte 1331 proximate to the surface of the microelectronic substrate 110. Accordingly, the flow passages 1484 are connected to a supply conduit 1447 which is in turn coupled to an electrolytic fluid source.

In one aspect of this embodiment, each electrode 1420a, 1420b is spaced apart from its neighbor by a dielectric layer 1429. The dielectric layer 1429 can terminate at a plane flush with the upper faces of the electrodes 1420a, 1420b. A polishing medium 1482 can then be positioned against the electrodes 1420a, 1420b and the upwardly facing edges of the dielectric layers 1429. In one aspect of this embodiment, the polishing medium 1482 can include a sub-pad 1487 which supports pad portions 1483. Each pad portion 1483 can include a polishing surface 1486 that contacts the microelectronic substrate 110 in a manner generally similar to that described above. In a further aspect of this embodiment, the sub-pad 1487 can include apertures aligned with the flow passage apertures 1485 to permit uninhibited flow of the electrolyte 1331 from the flow passages 1484. In another embodiment, the sub-pad 1487 can have a porous composition that helps to distribute the electrolyte 1331 in the interstices between neighboring pad portions 1483. In still another embodiment, the sub-pad 1487 can be eliminated, and the pad portions 1483 can be integral with the dielectric layers 1429 in an arrangement generally similar to that described above with reference to FIG. 13.

One feature of an embodiment of the apparatus 1460 shown in FIG. 14 is that the apertures 1485 of the flow passages 1484 are recessed away from the interface between the microelectronic substrate 110 and the polishing surfaces 1486. Accordingly, the electrolyte 1331 can flow freely out of the flow passages 1484 despite the presence of the microelectronic substrate 110.

Figure 15:
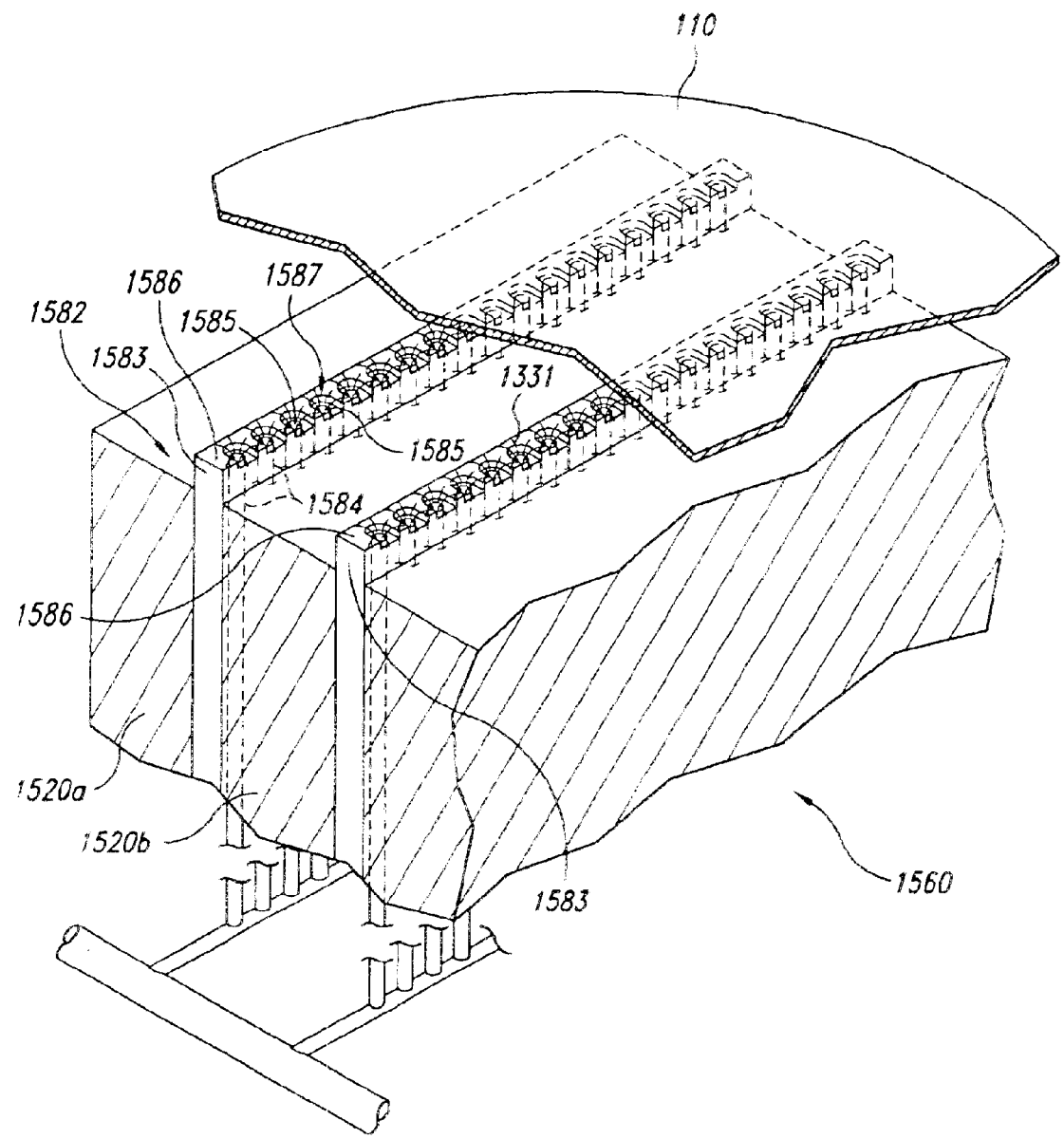
FIG. 15 is an isometric, partially schematic, partially cutaway isometric view of an apparatus having electrodes and a polishing medium in accordance with still another embodiment of the invention.

FIG. 15 is an isometric view of a portion of an apparatus 1560 having electrodes 1520a, 1520b and a polishing medium 1582 arranged in accordance with another embodiment of the invention. In one aspect of this embodiment, the polishing medium 1582 includes polishing pad portions 1583 that project beyond the electrodes 1520a, 1520b. Each polishing pad portion 1583 includes a polishing surface 1586 and a plurality of flow passages 1584. Each flow passage 1584 has an aperture 1585 proximate to the polishing surface 1586 to provide an electrolyte 1331 proximate to an interface between the microelectronic substrate 110 and the polishing surface 1586. In one aspect of this embodiment, the pad portions 1583 can include recesses 1587 surrounding each aperture 1585. Accordingly, the electrolyte 1331 can proceed outwardly from the flow passages 1584 while the microelectronic substrate 110 is positioned directly overhead.

Figure 16:
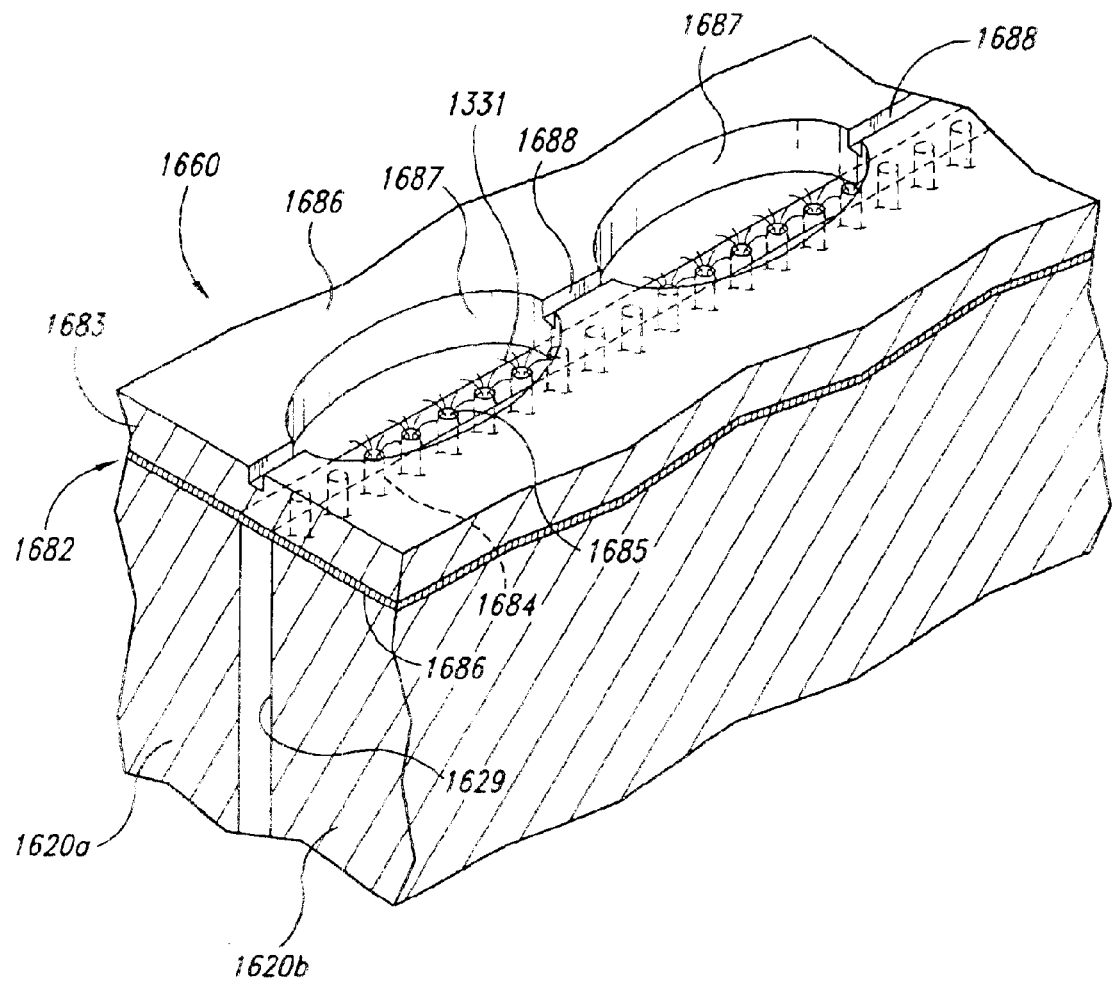
FIG. 16 is an isometric, partially schematic, partially cutaway view of an apparatus having a polishing medium with oval apertures in accordance with yet another embodiment of the invention.

FIG. 16 is an isometric view of a portion of an apparatus 1660 having a polishing medium 1682 configured in accordance with yet another embodiment of the invention. In one aspect of this embodiment, the polishing medium 1682 includes a polishing pad 1683 and sub-pad 1687 positioned against first electrodes 1620a and second electrodes 1620b. The electrodes 1620a, 1620b are separated by a dielectric layer 1629. The dielectric layer 1629 includes flow passages 1684 having apertures 1685 to deliver the electrolyte 1331 proximate to an interface between the polishing medium 1682 and the microelectronic substrate 110 (FIG. 15).

In one aspect of this embodiment, the polishing medium 1682 includes a polishing surface 1686 having a plurality of recesses 1689. The recesses 1689 can extend entirely through the polishing pad 1683 and the sub-pad 1687 to expose both the apertures 1685 and the upwardly-facing surfaces of the electrodes 1620a, 1620b. Accordingly, the recesses 1689 can provide for an uninhibited flow of electrolyte 1331 from the apertures 1685, and can provide for electrical communication (via the electrolyte 1331) between the electrodes 1620a, 1620b and the microelectronic substrate 110. The polishing medium 1682 can further include transverse channels 1688 that connect adjacent recesses 1689 and allow the electrolyte to pass from one recess 1689 to the other without being inhibited by the microelectronic substrate 110.

In one aspect of an embodiment described above with reference to FIG. 16, the recesses 1689 can have a generally oval planform shape. In other embodiments, the recesses 1689 can have other shapes (such as circular shapes) that allow for the flow of the electrolyte 1331 from the apertures 1685, and that allow for electrical communication between the electrodes 1620a, 1620b and the microelectronic substrate 110 via the electrolyte 1331. Accordingly, the recesses 1689 can extend entirely through the polishing pad 1683 and the sub-pad 1687 (as described above) or, in another embodiment, the recesses 1689 can extend through the polishing pad 1683 but not through the sub-pad 1687. The sub-pad 1687 can accordingly have a porous composition that allows the electrolyte 1331 to diffuse from the apertures 1685, through the sub-pad 1687 and into the recesses 1689.

Figure 17:
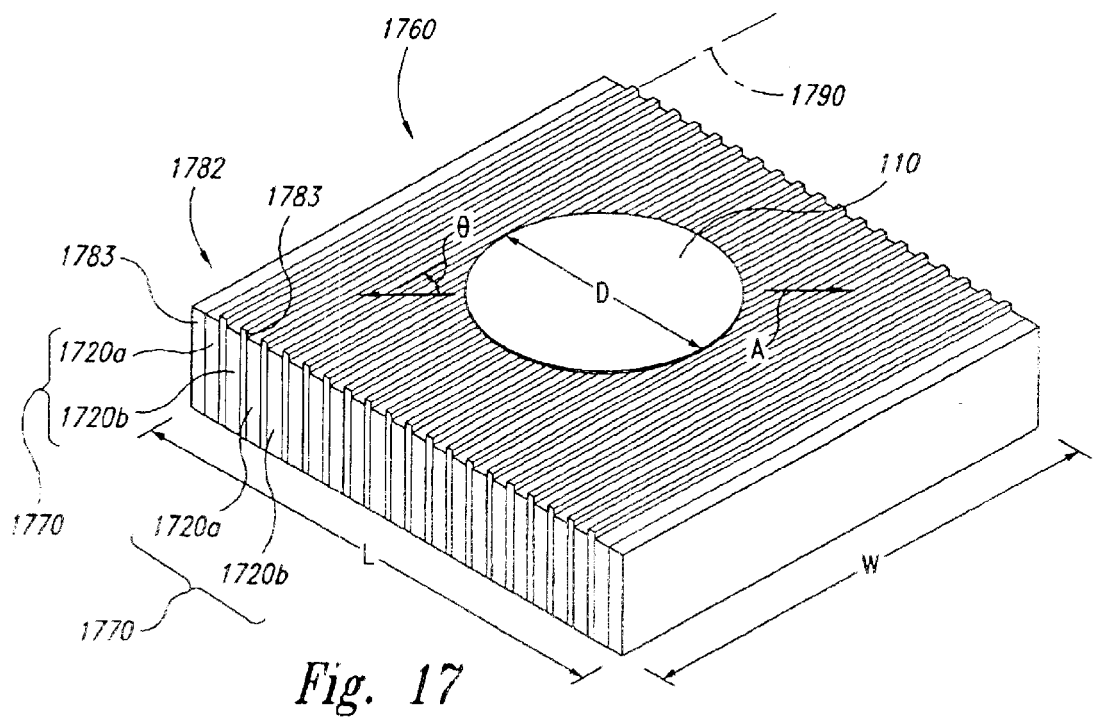
FIG. 17 is an isometric view of an apparatus supporting a substrate for motion along a path in accordance with another embodiment of the invention.

FIG. 17 is a top isometric view of an apparatus 1760 configured in accordance with still another embodiment of the invention. In one aspect of this embodiment, the apparatus 1760 includes electrode pairs 1770, each having a first electrode 1720a spaced apart from a second electrode 1720b. The apparatus 1760 can further include a polishing medium 1782 that has pad portions 1783 projecting beyond the upwardly-facing surfaces of electrodes 1720a, 1720b. Accordingly, the electrodes 1720a, 1720b and the polishing medium 1782 can remove material from the microelectronic substrate 110 in a manner generally similar to that described above.

The microelectronic substrate 110 can have a diameter D and the apparatus 1760 can have a length L and a width W, both of which are greater than the microelectronic substrate diameter D. Accordingly, the microelectronic substrate 110 can be moved about over the polishing medium 1782, all the while being in electrical communication with at least some of the electrodes 1720a, 1720b. As the microelectronic substrate 110 moves, different pairs of electrodes 1720a, 1720b provide electrical communication with the microelectronic substrate 110.

In a further aspect of this embodiment, the electrodes 1720a, 1720b and the pad portions 1783 are elongated parallel to an axis 1790. The microelectronic substrate 110 can move relative to the polishing medium 1782 back and forth in a direction indicated by arrow A. In a further aspect of this embodiment, an angle θ between arrow A and axis 1790 can be 90° or less. In one particular embodiment, θ can have a value of about 45°. Accordingly, the microelectronic substrate 110 can move across a plurality of electrical fields generated by a corresponding plurality of electrode pairs 1770 during processing. An advantage of this arrangement is that the uniformity with which material is removed from the microelectronic substrate 110 can be increased relative to an arrangement in which the center of the microelectronic substrate 110 does not move relative to the polishing medium 1782.

Figure 18:
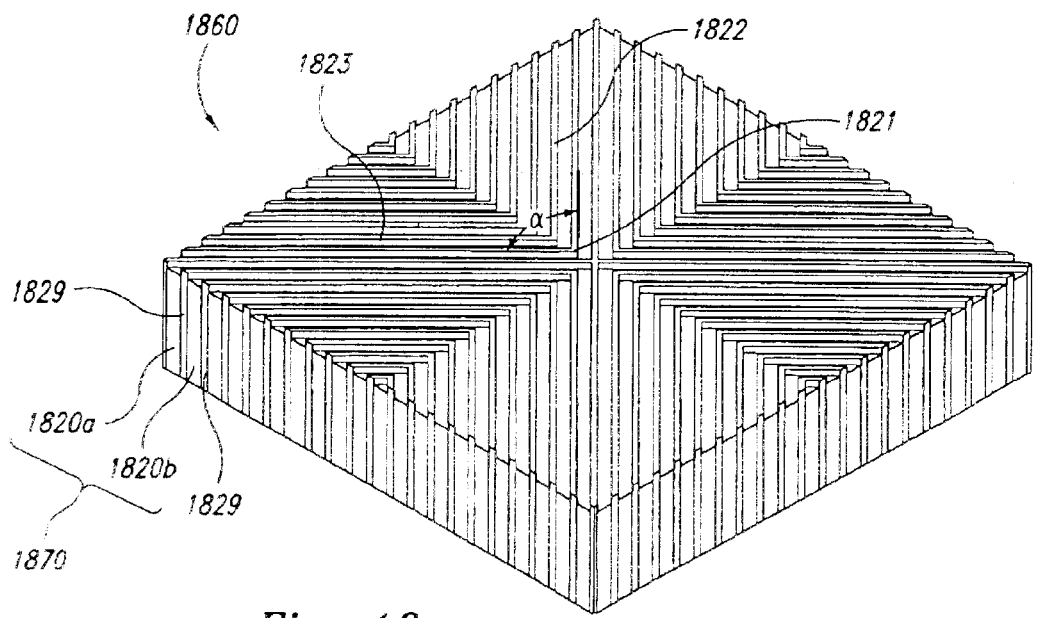
FIG. 18 is an isometric view of an apparatus having electrodes oriented in accordance with still another embodiment of the invention.

FIG. 18 is a top isometric view of an apparatus 1860 configured in accordance with yet another embodiment of the invention. In one aspect of this embodiment, the apparatus 1860 has electrode pairs 1870, each of which includes a first electrode 1820a and a second electrode 1820b. Adjacent electrodes 1820a, 1820b are separated by dielectric layer 1829. The apparatus 1860 can further include a polishing medium generally similar to any of those discussed above, but not shown in FIG. 18 for purposes of clarity.

In a further aspect of this embodiment, the electrodes 1820a, 1820b can have a herringbone or chevron shape, and can be arranged circumferentially to define a rectangular field. For example, each electrode 1820a, 1820b can include an apex or angled portion 1821 and first and second portions 1822, 1823 extending from the apex or angled portion 1821. The first and second portions 1822, 1823 can define an included angle having a value of 180° or less. In a particular embodiment, α can have a value of about 90° and in other embodiments, α can have other values. In any of these embodiments, when the microelectronic substrate 110 (FIG. 17) moves relative to the electrodes 1820a, 1820b, the microelectronic substrate 110 is exposed to a plurality of electrical fields generated by the plurality of electrode pairs 1870. As discussed above with reference to FIG. 17, an advantage of this arrangement is that the uniformity with which material is removed from the microelectronic substrate 110 can be improved.

From the foregoing, it will be appreciated that, although specific embodiments of the invention have been described herein for purposes of illustration, various modifications may be made without deviating from the spirit and scope of the invention. For example, other embodiments of the polishing media (shown in FIGS. 13–18 as facing upwardly to contact a downwardly facing surface of the microelectronic substrate) can face downwardly to contact an upwardly facing surface of the microelectronic substrate. Other embodiments of the apparatuses described above include combinations of features shown in separate Figures. For example, an apparatus in accordance with one embodiment includes liquid flow passages in both the polishing medium and the electrodes. The liquid flow passages can be coupled to the same or different sources of liquid. Accordingly, the invention is not limited except as by the appended claims.

We claim:

1. An apparatus for removing material from microelectronic substrates, comprising:

a support member configured to releasably carry a microelectronic substrate;

a first electrode spaced apart from the microelectronic substrate when the microelectronic substrate is carried by the support member;

a second electrode spaced apart from the microelectronic substrate when the microelectronic substrate is carried by the support member, the second electrode being spaced apart from the first electrode;

a polishing medium, at least a portion of which is positioned between the electrodes and the support member, the polishing medium having a polishing surface positioned to contact the microelectronic substrate when the microelectronic substrate is carried by the support member, wherein at least a portion of the first and second electrodes is recessed from the polishing surface; and a source of varying electrical signals coupled to at least one of the first and second electrodes, the source providing an electrical signal having a power sufficient to remove conductive material from the microelectronic substrate while the polishing medium contacts the microelectronic substrate, wherein the first electrode, the second electrode and a portion of the polishing medium between the first and second electrodes are elongated along parallel axes.

2. The apparatus of claim 1 wherein the polishing medium includes a polishing pad material.

3. The apparatus of claim 1 wherein the polishing medium includes a plurality of flow passages coupleable to a source of liquid, and wherein each flow passage has an aperture at least proximate to the polishing surface, the apertures being positioned to dispense the liquid at least proximate to the polishing surface.

4. The apparatus of claim 1 wherein the first and second electrodes face toward the support member.

5. The apparatus of claim 1 wherein the portion of the polishing medium includes a plurality of flow passages coupleable to a source of liquid, and wherein each flow passage has an aperture proximate to the polishing surface.

6. The apparatus of claim 5 wherein the portion of the polishing medium includes a plurality of recesses, and wherein each recess is generally aligned with one of the apertures of the flow passages.

7. The apparatus of claim 1 wherein the polishing medium includes a polyurethane material.

8. The apparatus of claim 1 wherein the first and second electrodes are recessed from the polishing surface by a distance of from about 0.1 millimeter to about ten millimeters.

9. The apparatus of claim 1 wherein the microelectronic substrate has a diameter and the first and second electrodes each have a length greater than the diameter.

10. The apparatus of claim 1 wherein the first electrode has a length and a first width less than and generally transverse to the length, and wherein the polishing medium has a second width that is less than the first width.

11. The apparatus of claim 1 wherein the first electrode has a plurality of flow passages coupleable to a source of liquid, and wherein each flow passage has an aperture proximate to the polishing medium, the apertures being positioned to dispense the liquid proximate to the polishing surface.

12. The apparatus of claim 1 wherein the polishing medium has a plurality of flow passages coupleable to a source of liquid, and wherein each flow passage has an aperture proximate to the polishing surface, further wherein the polishing medium includes a recess proximate to each aperture, the recess being offset from the polishing surface.

13. The apparatus of claim 12 wherein the polishing surface is spaced apart from the first and second electrodes, and wherein at least some of the recesses are open to a region adjacent to the electrodes.

14. The apparatus of claim 12 wherein at least one recess has a miameter larger than a diameter of a corresponding aperture about which the recess is disposed.

15. The apparatus of claim 1 wherein the polishing medium has a first recess, a second recess, and a channel coupling the first and second recesses, and wherein the polishing medium further includes a first plurality of flow passages coupleable to a source of liquid and having apertures located in the first recess, and a second plurality of flow passage coupleable to the source of liquid and having apertures located in the second recess.

16. An apparatus for removing material from microelectronic substrates, comprising:
 a support member configured to releasably carry a microelectronic substrate;
 a first electrode spaced apart from the microelectronic substrate when the microelectronic substrate is carried by the support member;
 a second electrode spaced apart from the microelectronic substrate when the microelectronic substrate is carried by the support member, the second electrode being spaced apart from the first electrode;
 a polishing medium, at least a portion of which is positioned between the electrodes and the support member, the polishing medium having a polishing surface positioned to contact the microelectronic substrate when the microelectronic substrate is carried by the support member, wherein the polishing medium has at least one opening aligned with the first and second electrodes, the opening being positioned to allow electrical communication between the electrodes and the microelectronic substrate when the microelectronic substrate is carried by the support member; and
 a source of varying electrical signals coupled to at least one of the first and second electrodes, the source providing an electrical signal having a power sufficient to remove conductive material from the microelectronic substrate while the polishing medium contacts the microelectronic substrate, wherein the first electrode, the second electrode and the polishing medium are elongated along parallel axes.

17. The apparatus of claim 16 wherein the first and second electrodes face directly toward the support member.

18. The apparatus of claim 16 wherein the first and second electrodes face directly toward the support member with a dielectric material disposed between the first and second electrodes and the support member.

19. The apparatus of claim 16 wherein the opening has a generally oval shape.

20. The apparatus of claim 16 wherein the polishing medium includes a plurality of flow passages coupleable to a source of liquid, and wherein each flow passage has an aperture at least proximate to the polishing surface, the apertures being positioned to dispense the liquid at least proximate to the polishing surface.

21. The apparatus of claim 16 wherein the polishing medium has a plurality of flow passages coupleable to a source of liquid, and wherein each flow passage has an aperture proximate to the polishing surface, further wherein the opening of the polishing medium is aligned with the apertures.

22. The apparatus of claim 21 wherein the polishing medium further includes a plurality of recesses, and wherein each recess is generally aligned with one of the apertures of the flow passages.

23. The apparatus of claim 16 wherein the first and second electrodes are recessed from the polishing surface.

24. The apparatus of claim 16 wherein the first electrode has a plurality of flow passages coupleable to a source of liquid, and wherein each flow passage has an aperture proximate to the polishing medium, the apertures being positioned to dispense the liquid proximate to the polishing surface.

25. The apparatus of claim 16 wherein the first electrode has a plurality of flow passages coupleable to a source of liquid, and wherein each flow passage has an aperture proximate to the polishing medium, the apertures being aligned with the opening in the polishing pad to dispense the liquid proximate to the polishing surface.

26. A method for removing material from a microelectronic substrate, comprising:
 positioning the microelectronic substrate proximate to and spaced apart from a first electrode, the first electrode being elongated along a first axis;
 positioning the microelectronic substrate proximate to and spaced apart from a second electrode, the second electrode being spaced apart from the first electrode and elongated along a second axis; and
 removing conductive material from the microelectronic substrate by moving the microelectronic substrate relative to the first and second electrodes in a direction transverse to at least one of the first and second axes while passing a variable electrical signal from one electrode through an electrolyte to the microelectronic substrate and from the microelectronic substrate to the other electrode while the electrodes are spaced apart from the microelectronic substrate.

27. The method of claim 26, further comprising engaging the microelectronic substrate with a polishing medium while passing the variable electrical signal through the first and second electrodes and the microelectronic substrate.

28. The method of claim 26, further comprising:
 engaging the microelectronic substrate with a polishing medium while passing the variable electrical signal through the first and second electrodes and the microelectronic substrate; and removing material from the microelectronic substrate at an interface between the microelectronic substrate and the polishing medium.

29. The method of claim 26, further comprising engaging the microelectronic substrate with a polishing surface of a polishing medium while passing the variable electrical signal through the first and second electrodes and the microelectronic substrate, and wherein positioning the microelectronic substrate proximate to the first electrode includes positioning the microelectronic substrate proximate to the first electrode with the first electrode being recessed from the polishing surface.

30. The method of claim 26 wherein positioning the microelectronic substrate proximate to a first electrode includes positioning the microelectronic substrate proximate to a first chevron-shaped electrode, and wherein positioning the microelectronic substrate proximate to a second electrode includes positioning the microelectronic substrate proximate to a second chevron-shaped electrode.

31. A method for removing material from a microelectronic substrate, comprising:
    contacting the microelectronic substrate with a polishing surface of a polishing medium;
    positioning the microelectronic substrate proximate to and spaced apart from a first electrode, the first electrode being recessed from the polishing surface;
    positioning the microelectronic substrate proximate to and spaced apart from a second electrode, the second electrode being spaced apart from the first conductive electrode and being recessed from the polishing surface; and
    removing conductive material from the microelectronic substrate by moving the microelectronic substrate relative to the first and second electrodes while passing a variable electrical signal from one electrode through an electrolyte to the microelectronic substrate and from the microelectronic substrate to the other electrode while the electrodes are spaced apart from the microelectronic substrate, wherein the first and second electrodes are elongated along an axis and wherein moving the microelectronic substrate includes moving the microelectronic substrate in a direction transverse to the axis.

32. The method of claim 31, further comprising removing material from the microelectronic substrate at an interface between the microelectronic substrate and the polishing surface.

33. The method of claim 31 wherein the polishing medium includes polishing pad material and wherein the method further comprises disposing a polishing liquid between the polishing pad material and the microelectronic substrate.

34. The method of claim 31, further comprising engaging the microelectronic substrate with the polishing medium while passing the variable electrical signal through the first and second electrodes and the microelectronic substrate.

35. The method of claim 31 wherein at least one of the first and second electrodes includes a flow passage coupled to a source of polishing liquid and wherein the method further comprises directing the polishing liquid through the flow passage and at least proximate to an interface between the polishing medium and the microelectronic substrate.

36. The method of claim 31 wherein the polishing medium includes a flow passage coupled to a source of polishing liquid and wherein the method further comprises directing the polishing liquid through the flow passage and at least proximate to an interface between the polishing medium and the microelectronic substrate.

37. The method of claim 31, further comprising directing an electrolytic liquid through at least one flow passage in the polishing medium, and out of the flow passage to an area of the polishing medium that is recessed from the polishing surface.

38. The method of claim 37, further comprising directing the electrolytic liquid through an opening in the recessed area and into electrical communication with at least one of the electrodes.

39. The method of claim 31, further comprising:
    directing a first portion of electrolytic liquid through a first plurality of apertures and into a first recess of the polishing medium that communicates with the first plurality of flow passages, with the first portion of the electrolytic liquid in communication with the microelectronic workpiece and the first and second electrodes while in the first recess;
    directing a second portion of electrolytic liquid through a second plurality of apertures and into a second recess of the polishing medium that communicates with the second plurality of flow passages, with the second portion of the electrolytic liquid in communication with the micorelectronic workpiece and the first and second electrodes while in the second recess; and
    directing at least some of the first portion of the electrolytic liquid into the second recess via a passage connecting the first and second recesses.

40. A method for processing a microelectronic substrate, comprising:
    contacting the microelectronic substrate with a polishing surface of a polishing medium;
    positioning the microelectronic substrate proximate to and spaced apart from a first electrode and a second electrode spaced apart from the first electrode;
    directing a flow of liquid through passages in the polishing medium to a region at least proximate to an interface between the polishing surface and the microelectronic substrate; and
    moving the microelectronic substrate relative to the polishing surface and the first and second electrodes while passing a variable electrical signal from one electrode to the other via the microelectronic substrate to remove material from the microelectronic substrate, wherein the first and second electrodes are elongated along an axis and wherein moving the microelectronic substrate includes moving the microelectronic substrate in a direction transverse to the axis.

41. The method of claim 40, further comprising engaging the microelectronic substrate with the polishing medium while passing the variable electrical signal through the first and second electrodes and the microelectronic substrate.

42. The method of claim 40 wherein the passages are first passages and the liquid is a first liquid, and wherein the method further comprises directing the first liquid and/or a second liquid through second flow passages in at least one of the first and second electrodes.

43. The method of claim 40 wherein directing a flow of liquid includes directing a flow of electrolytic liquid.

44. The method of claim 40 wherein directing a flow of liquid includes directing a flow of liquid to an aperture recessed from the polishing surface.

45. The method of claim 40 wherein directing a flow of liquid includes directing a flow of liquid into an opening between at least one of the first and second electrodes and the microelectronic substrate.

* * * * *